6/12/84 XR 4,454,610

United States Patent [19]

Sziklai

[11] 4,454,610

[45] Jun. 12, 1984

[54] METHODS AND APPARATUS FOR THE AUTOMATIC CLASSIFICATION OF PATTERNS

[75] Inventor: George C. Sziklai, Los Altos Hills, Calif.

[73] Assignee: Transaction Sciences Corporation, New Orleans, La.

[21] Appl. No.: 337,393

[22] Filed: Jan. 6, 1982

Related U.S. Application Data

[63] Continuation-in-part of Ser. No. 907,836, May 19, 1978, which is a continuation of Ser. No. 118,453, Feb. 4, 1980, abandoned.

[51] Int. Cl.$^3$ .................. G06K 9/00

[52] U.S. Cl. .................. 382/3; 235/380; 235/494; 340/825.34; 382/31; 382/43

[58] Field of Search .................. 382/3, 33-34, 382/41-43; 179/1 SA; 235/457, 487, 489, 494, 470, 379-382; 340/825.3, 825.31, 825.34; 355/52

[56] References Cited

U.S. PATENT DOCUMENTS

| | | | |
|---|---|---|---|
| 3,781,109 | 12/1973 | Mayer, Jr. et al. | 355/52 |
| 3,806,704 | 4/1974 | Shinal | 235/61.7 B |
| 3,846,752 | 11/1974 | Nakano et al. | 340/146.3 Q |
| 3,859,515 | 1/1975 | Radcliffe | 235/164 |
| 3,869,697 | 3/1975 | Kawasaki | 382/43 |
| 3,894,756 | 7/1975 | Ward | 283/7 |
| 4,014,602 | 3/1977 | Ruell | 350/3.5 |
| 4,034,211 | 7/1977 | Horst et al. | 235/61.12 N |
| 4,073,010 | 2/1978 | Casasent et al. | 382/43 |
| 4,076,960 | 2/1978 | Buss et al. | 179/1 SA |
| 4,126,373 | 11/1978 | Moraw | 350/3.61 |
| 4,150,781 | 4/1979 | Silverman | 235/382 |
| 4,202,626 | 5/1980 | Mayer et al. | 355/52 |
| 4,213,036 | 7/1980 | Kopp et al. | 382/43 |
| 4,225,850 | 9/1980 | Chang et al. | 382/43 |
| 4,310,721 | 1/1982 | Manley et al. | 179/1 SA |

FOREIGN PATENT DOCUMENTS

| | | |
|---|---|---|
| 2653091 | 5/1978 | Fed. Rep. of Germany . |
| 1428469 | 3/1976 | United Kingdom . |

OTHER PUBLICATIONS

Nemcek, et al., "Experimental Investigation of Automatic Signature Verification", Jan. 1974, 230b IEEE Transactions on Systems and Cybernetics, vol. SMC, No. 1, pp. 121-126.

*Primary Examiner*—Leo H. Boudreau
*Attorney, Agent, or Firm*—Schapp and Hatch

[57] ABSTRACT

Methods and apparatus for the automatic classification of patterns are disclosed in which the intensity or gray level values of selected pixels of digital images of functions of position-invariant transforms of patterns to be classified, displayed as intensity functions, are correlated with one or more stored sets of values, each such stored set of values corresponding to one of the classes into which the unclassified patterns are to be classified. Methods of determining the coordinates of the selected pixels for use in automatic signature verfication and automatic handwritten numeral recognition are disclosed.

13 Claims, 24 Drawing Figures

FIG. 10A.
$$CC = \frac{\sum U_i S_i}{\left(\sum U_i^2 \sum S_i^2\right)^{\frac{1}{2}}}$$
FIG. 11.
FIG. 10B.
FIG. 10C.
FIG. 10D.
FIG. 10E.
FIG. 10F.
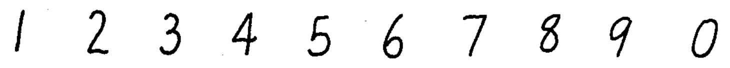
FIG. 10H.
FIG. 10G

METHODS AND APPARATUS FOR THE AUTOMATIC CLASSIFICATION OF PATTERNS

This is a continuation-in-part of U.S. patent application Ser. No. 907,836, filed May 19, 1978 and a continuation of U.S. patent application Ser. No. 118,453, filed Feb. 4, 1980, now abandoned

BACKGROUND OF THE INVENTION

1. Field of the Invention

My invention relates to methods and apparatus for the automatic classification of patterns, and more particularly to methods and apparatus of the class including those disclosed in my co-pending U.S. patent application, Ser. No. 907,836, filed May 19, 1978, the teachings of which are incorporated herein by reference. It will be understood by those having ordinary skill in the art, informed by the teachings of these two patent applications, that certain ones of the cryptographic teachings of my said co-pending application may be incorporated into systems embodying my present invention by those having ordinary skill in the art without the exercise of invention.

The expression "automatic classification of indicia" as used herein denotes but is not limited to optical character recognition (OCR) and automatic signature verification.

2. Description of the Prior Art

Many methods and apparatus for the automatic classification of patterns are found in the prior art.

Holographic methods and apparatus for the classification of patterns are shown and described in U.S. Pat. Nos. 3,620,590; 3,643,216; and 4,053,228. See also, "Holographic Filing: An Industry on the Verge of Birth", by Thomas H. Maugh II, *Science,* Vol. 201, Aug. 4, 1978, pages 431 and 432.

It is suggested at pages 177 through 184 of *Introcuduction to Fourier Optics,* by Joseph W. Goodman, McGraw-Hill, 1968, that optical data processing methods and apparatus may be applied to character recognition.

Most of these prior art methods and apparatus have, however, been characterized by complexity and high cost, and have involved many steps of human judgement and selection in their design.

SUMMARY OF THE INVENTION

Accordingly, it is an object of my invention to provide methods and apparatus for the automatic classification of patterns which are simpler, less complex, less costly, and more reliable than the prior art methods and apparatus.

It is a further object of my invention to provide methods and apparatus for the automatic determination of certain parameters of particular automatic pattern classification devices embodying my invention.

Other objects and aspects of my invention will in part be obvious and will in part appear hereinafter.

My invention, accordingly, comprises the several steps, and the relation of one or more such steps with respect to each of the others, and the apparatus embodying features of construction, combinations of elements, and arrengements of parts which are adapted to effect such steps, all as exemplified in the following disclosure, and the scope of my invention will be indicated in the appended claims.

In accordance with one aspect of my invention, an automatic pattern classification device comprises a pattern spectrum generator, which generates partial representations of functions of pattern spectra from patterns which are successively presented to it, and further comprises a small plurality, e.g., 30, of gray level or intensity value detectors (sometimes hereinfter called "pixel value detectors" or "pixel detectors") each of which is operatively related in gray level or intensity value detecting relation to a corresponding pixel or element of each successive one of said partial representations of functions of pattern spectra. The plurality of pixels juxtaposed to said detectors when a particular pattern is presented to said pattern spectrum generator will hereinafter be called an "unclassified pixel constellation". The corresponding plurality of gray level or intensity values sensed by said detectors will hereinafter be called the corresponding "unclassified pixel value set".

In accordance with another aspect of my invention, methods are provided for determining the unclassified pixel constellations for particular pattern classification devices embodying my invention, which methods may be carried out by image processing systems of well-known type.

In accordance with another aspect of my invention, some of said pattern classification devices comprise a plurality of memory devices or locations each containing a set of gray level or intensity value representations corresponding to a particular one of the set of classes into which the unclassified patterns, i.e., the patterns presented to the pattern spectrum generator, are to be classified. Such a set of values may hereinafter be called a "class value set" or "classification value set".

In accordance with another aspect of my invention, some indicium or pattern classification devices thereof comprise a single memory containing a single set of gray level or intensity value representations, and the indicia presented to the associated indicium spectrum generator are classified as having or not having the same signification and/or origination as the indicium from which said representations were derived.

In accordance with another aspect of my invention, indicia may be classified in accordance with two properties, viz., origination and signification, "origination" meaning generally the generating source of a particular indicium, and "signification" meaning generally the immediate, primary, or apparent meaning of a particular indicium.

When a class value set as defined above is adapted to be used in classifying indicia according to their signification only it may be called a "signification value set". When a class value set as defined above is adapted to be used in classifying indicia according to their origination only, it may be called an "origination value set". The corresponding set of gray level or intensity values derived friom an unclassified indicium by the indicium spectrum generator may be called an "unclassified indicium value set" or "unclassified value set".

In accordance with another aspect of my invention, methods and apparatus are provided for determining the class value sets to be employed in particular pattern classification devices embodying my invention, and more particularly methods and apparatus are provided for determining the signification value sets, the origination value sets, or both to be used in particular indicium classification devices embodying my invention. It is to be noted that my invention contemplates certain embodiments in which theretofore unclassified indicia are to be classified in accordance with both their signification and their origination.

In accordance with another aspect of my invention, each unclassified value set produced by a pattern spectrum generator of a particular pattern classification device of my invention is to be correlated with each of the one or more classification value sets stored in the memory of that device, or on the document bearing the corresponding unclassified pattern in printed or other convenient form, in accordance with the one-dimensional correlation formula of FIG. 11, and the most probable classification of the unclassified pattern is to be indicated by suitable indicating means or the document rejected by suitable rejecting means if the correlation coefficient value corresponding to the unclassified value set is less than a predetermined threshold value.

In accordance with another aspect of my invention, a pattern classification device embodying my invention may be provided with indicating means to indicate that an unclassified pattern presented for classification is not a member of any of the classes to which the class value sets stored in its memory devices or locations correspond.

In accordance with another aspect of my invention, each unclassified value set produced by an indicium spectrum generator of a particular type of indicium classification device of my invention is to be correlated with a single class value set which is derived from the document bearing the corresponding unclassified indicium, and suitable indicating means is provided to indicate whether the unclassified indicium presented falls within the class of indicia corresponding to said single class value set or does not.

For a fuller understanding of the nature and objects of my invention reference should be had to the following detailed description, taken in connection with the accompanying drawings.

BRIEF DESCRIPTION OF THE DRAWINGS

FIG. 2B illustrates an indicium spectrum matrix of a kind which might be used in constructing an embodiment of my invention;

FIGS. 10A through 10D illustrate handwritten arabic numerals of the same signification but different origination;

FIGS. 10E through 10G illustrate handwritten arabic numerals of the same signification but different origination;

FIG. 10H illustrates a set of handwritten arabic numerals of the same origination or "style";

FIG. 11 represents as a mathematical formula the one-dimensional correlation coefficient determining algorithm employed in indicium classification devices embodying my invention.

DESCRIPTION OF PREFERRED EMBODIMENTS

Before describing particular embodiments of my invention, the general principles and technological context thereof will be described in detail.

Figure 1:
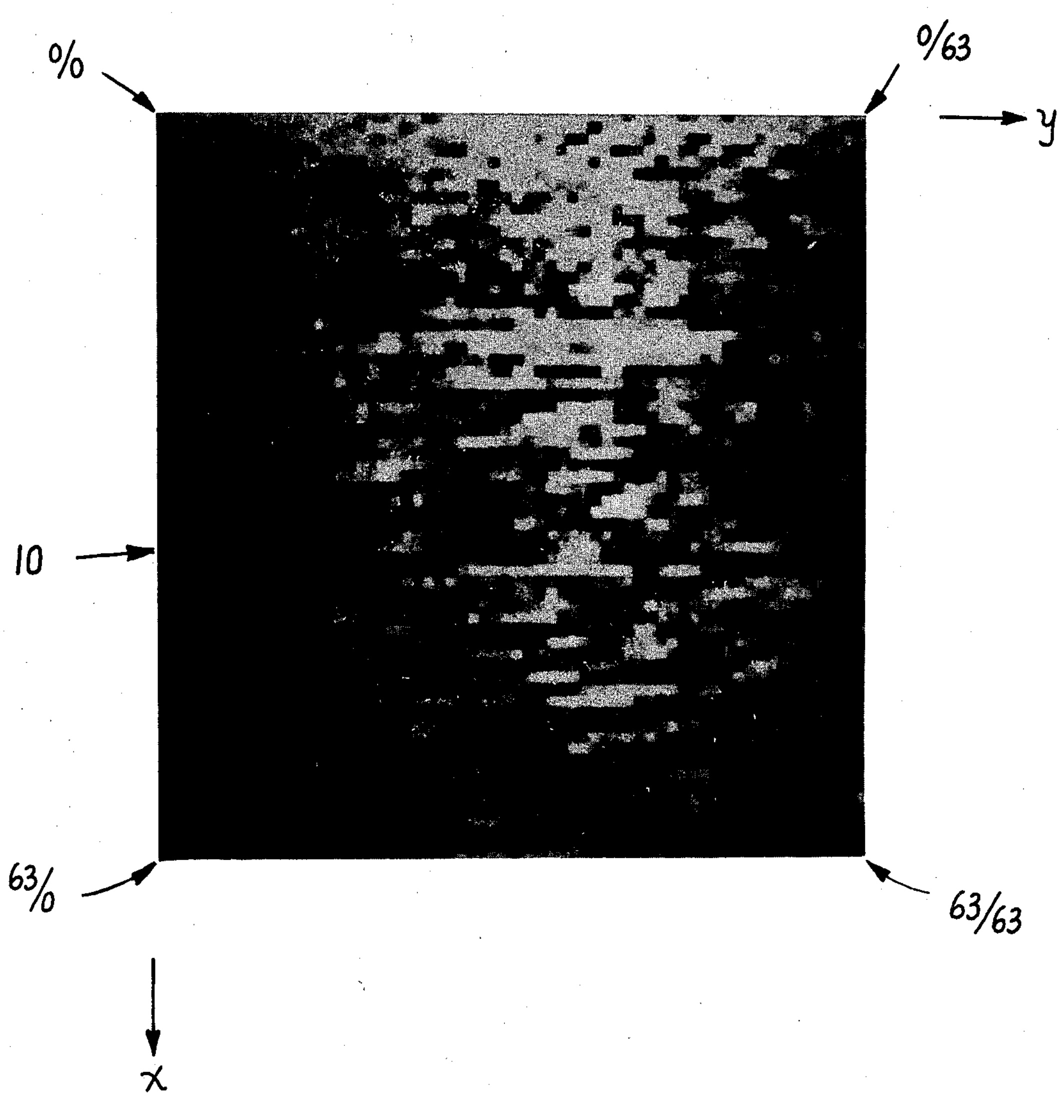
FIG. 1 illustrates a partial digital image of a logarithmic function of the Fourier spectrum of a handwritten signature, displayed as an intensity function.

Referring now to FIG. 1, there is represented a partial digital image of the (absolute) magnitude of the two-dimensional Fourier spectrum of a handwritten signature, logarithmically enhanced and displayed as an intensity function.

In describing digital images of patterns or their spectra hereinafter, the terminology and conventions employed in *Digital Image Processing,* by Rafael C. Gonzalez and Paul Wintz, published by Addison-Wesley Publishing Company, Inc., 1977, (hereinafter "Gonzalez-Wintz") will generally be observed unless the context indicates otherwise.

Particular reference is had to pages 5, 6, and 21 through 31 of Gonzalez-Wintz at which terminology and conventions for describing digital images are discussed; and pages 38 through 51 of Gonzalez-Wintz at which the two-dimensional Fourier transform, both continuous and discrete, and the logarithmic enhancement of intensity function displays of Fourier spectra are discussed. In this connection, it is to be noted that the expression "digital image" may sometimes be used herein to denote not only a particular light intensity function (cf., Gonzalez-Wintz, page 5) but also the corresponding digital image representation (cf., Gonzalez-Wintz, page 6, FIG. 1.5).

The term "representation" as used herein is not limited to human-viewable displays, but rather also embraces corresponding data stored in computer memories and the like.

The partial digital image representation of FIG. 1 is of the continuous or "no-background" type which may be used in some embodiments of my invention. It is to be understood, however, that other types of digital image representations of functions of spectra of handwritten signatures, displayed as intensity functions, (e.g., wherein the elements or "pixels" are set in a substantially uniform background) may also be used in practicing my invention.

It is also to be understood that representations of partial digital images of logarithmic functions of the Fourier spectra of handwritten signatures, displayed as intensity functions, will sometimes be called "digital log Fourier signature spectra" herein, whether they are of the "no-background" type or of the "background" or "isolated pixel" type.

Referring again to FIG. 1, it can be seen that the partial digital log Fourier signature spectrum 10 of FIG. 1 is a $64 \times 64$ array of halftone pixels, each pixel imprinted at one of sixteen gray level values or intensity values. It is to be understood that the term "intensity" as used herein is to be taken as synonymous with the expressions "gray level value" and "intensity value" unless the context indicates otherwise.

Each of the pixels of partial digital log Fourier signature spectrum 10 may be individually identified by a pixel location code of conventional type (cf., Gonzalez-Wintz, pages 5 and 6) in which the upper lefthand pixel shown in FIG. 1 is designated by a particular x/y code value 0/0, the upper righthand pixel shown in FIG. 1 is identified by the particular x/y code value 0/63, and the lower righthand pixel shown in FIG. 1 is identified by the particular x/y code value 63/63, etc.

Figure 3:
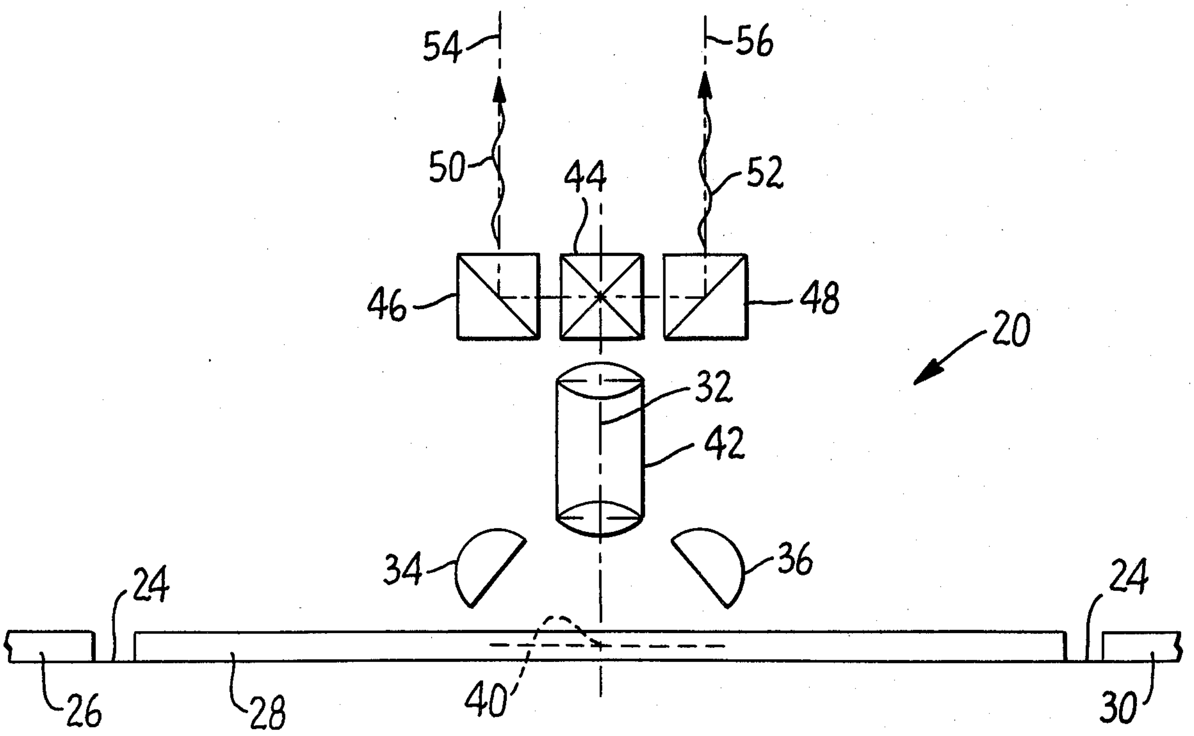
FIGS. 3, 4, 5A, 5B, and 5C schematically represent a pattern spectrum generator which may be used in an indicium classification device embodying my invention.

As will be obvious to those having ordinary skill in the optical computing art, it may be appropriate in some contexts to substitute the corresponding frequency variables u and v for the indicated spatial variables x and y in FIG. 1, etc., since FIG. 1 represents a Fourier spectrum, which exists in the frequency domain. The relationship between the amplitude of a Fourier spectrum at a particular point u, v and the intensity of the corresponding point of an intensity function display or representation of the same Fourier spectrum is shown in FIGS. 3.2(*b*) and 3.2(*c*) at page 40 of Gonzalez-Wintz.

The insular pixels of background-type digital log Fourier signature spectra, or the pixels of any other digital images may, of course, be identified in the same way.

The digital image of FIG. 1 represents less than one-half of the digital log two-dimensional Fourier spectrum of a signature, the central point or point of symmetry of the entire signature spectrum being located on the y-axis of the digital image of FIG. 1 at the upper common corner of the 0/31 and 0/32 pixels, this location representing zero spatial frequency in all directions.

As will be understood by those having ordinary skill in the art, informed by the present disclosure, either full Fourier spectrum function representations or partial Fourier spectrum function representations may be used in carrying out my invention, but in most embodiments the employment of partial Fourier spectrum function representations avoids expensive redundancy in equipment and data storage space. For convenience, the adjective "partial" may sometimes be omitted hereinafter. Also, other position-invariant image spectra, and functions thereof other than logarithmic functions, may be employed in practicing my invention.

The term "digital image" as used herein is as broad as the definition of digital image of equation (2.3-1) found at page 23 of Gonzalez-Wintz. Further, the term "digital image" as used herein also embraces coded arrays or coded images of the type shown in FIGS. B.2, B.4, B.6, B.8, etc. of Gonzalez-Wintz. An additional type of image embraced by the term "digital image" as used herein is the type of coded array in which the various pixel values are displayed in bar-code form, rather than numerical or alphabetic form or gray level form.

Figure 2:
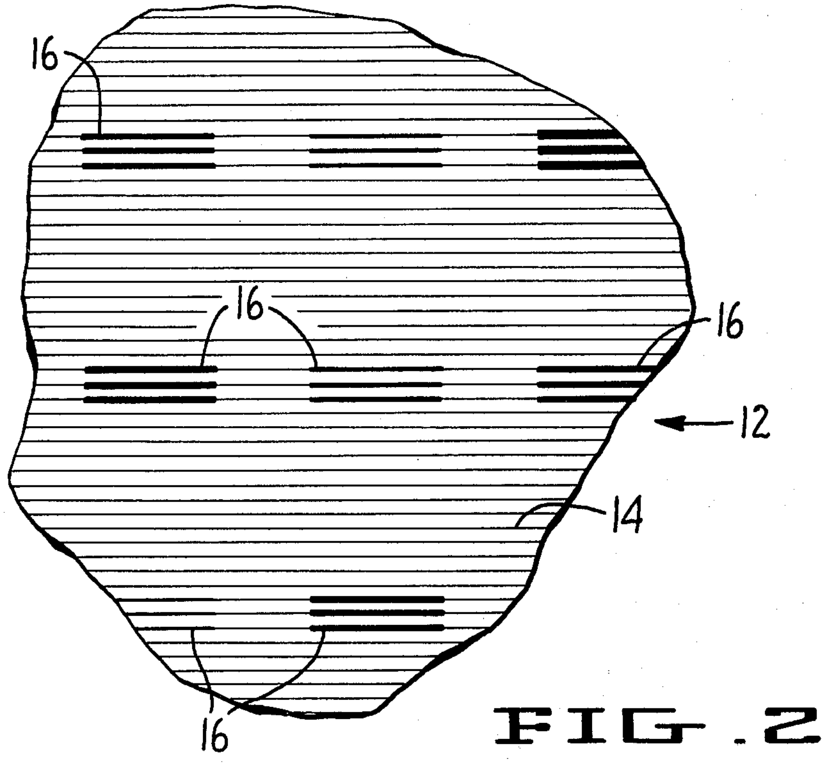
FIG. 2 illustrates a small portion of an "insular pixel" digital log Fourier signature spectrum as displayed on the display tube of an indicium spectrum generator of my invention.

Referring now to FIG. 2, there is shown a small portion of an "insular pixel" digital log two-dimensional Fourier signature spectrum such as might be displayed on display tube face 152 of the indicium spectrum generator which is described hereinafter.

As seen in FIG. 2, the partial digital log Fourier signature spectrum 12 of that figure comprises a background 14 on which are disposed a plurality of isolated pixels 16. As will be evident to those having ordinary skill in the art, background 14 is made up of raster lines, e.g., of the kind well-known in the television art, and the individual pixels 16 are each made up of a plurality of parallel, adjacent raster line segments which are brightened (darkened as seen in FIG. 2) in accordance with a function of the mean amplitude of the corresponding area of the log Fourier signature spectrum which is represented by the digital image of FIG. 2. As will be understood by those having ordinary skill in the art, informed by the present disclosure, each pixel 16 may alternatively be "written" on display screen 152 of the indicium spectrum generator display tube 120 (FIG. 4) by applying a high-frequency "wobble" signal to the vertical deflection means of display tube 120 while the writing beam is traversing the center raster line of the pixel area, and while at the same time the corresponding brightening signal is being applied to the writing beam controlling means.

Definitions of "indicium" and "indicia". While the digital images of logarithmic functions of Fourier spectra discussed hereinabove are all digital images of logarithmic functions of the Fourier spectra of handwritten signatures, it is to be understood that the field of application of my invention is not limited to handwritten signatures.

Rather, the field of application of my invention embraces many other fields of indicia, such as handwritten arabic numerals, typewritten alphabetic and numerical characters, handwritten block letters, shorthand outlines, machine shorthand tape codes, characters, whether machine-written or handwritten, of non-alphabetic or "character" languages, characters of non-Roman-alphabet languages, e.g., Cyrillic, etc.

Thus, the term "indicium" is used herein in its broadest acceptation to denote any discriminating mark, sign, token, indication, or, in general, any pattern which has a patent information content, i.e., which has an immediate meaning or significance for a substantial class of human viewers.

The term "indicia" is used herein to denote the plural of the term "indicium" as defined herein.

The term "pattern" is used herein in its broadest acceptation to denote anything which is to be or is fit to be copied or imitated, including indicia.

It is to be noted that many of the indicia to which my invention applies are possessed not only of patent information content but also of latent information content. For example, a handwritten signature may not only possess a patent information content, in the sense that a viewer thereof can immediately deduce the signer's name therefrom, but may also possess a latent information content, sometimes called "style", whereby a viewer familiar with the handwriting of the signer may be able to verify that handwritten signature as originating with or having been written by the signer.

In general, the latent information content or style of an indicium, which tends to identify or categorize the source of origin or origination of that indicium, be it human writer or particular writing machine, will be denoted herein by the expression "origination information content".

The term "indicium spectrum". It is further to be understood that while certain embodiments of my invention shown and described herein make use of partial digital images of logarithmic functions of the two-dimensional Fourier spectra of indica, e.g., signatures, displayed as intensity functions, my invention is not limited to the use of Fourier spectra, or to logarithmic functions of such spectra. Rather, my invention generally embraces the use of two-dimensional functions of position-invariant spectra of indicia, e.g., Mellin or Z spectra, whether optically generated or generated by automatic computation, and whether logarithmically or otherwise enhanced, or unenhanced.

Thus, the term "indicium spectrum" as used herein embraces not only digital images of logarithmic functions of the Fourier spectra of handwritten signatures, displayed as intensity functions, but also embraces digital images of unenhanced Fourier spectra of indicia, displayed as intensity functions, and digital images of other position-invariant spectra of indicia, whether enhanced or unenhanced, and whether derived optically or computationally. Further, the term "indicium spectrum" as used herein is not limited to images of complete spectra. Thus, the expression "indicium spectrum" as used herein embraces the partial digital image of a logarithmic function of the Fourier spectrum of a handwritten signature shown in FIG. 1, despite the fact that it would be obvious to one having ordinary skill in the optical computation art that the digital image of FIG. 1 represents less than one-half of its corresponding log Fourier spectrum.

Indicium spectrum generators. Every embodiment of my invention comprises at least one device adapted to produce pattern or indicium spectra when the corresponding patterns or indicia are presented to it.

Such a device is generally denominated a "pattern spectrum generator" or "indicium spectrum generator" herein.

Taking the term "indicium spectrum" as broadly defined hereinabove, it will be evident to those having ordinary skill in the optical data processing art that many devices known to that art, or obvious combinations of devices known to that art, are indicium spectrum generators.

For example, many different indicium spectra, such as the digital log Fourier signature spectrum 10 of FIG. 1, may be generated by data processing systems of the kind sometimes called image processing systems. Such an image processing system is the IDIMS (Interactive Digital Image Manipulation System), manufactured by ESL Incorporated of Sunnyvale, Calif. Specimens of the IDIMS image processing system are found, e.g., at the EROS Data Center and the NASA Ames Research Center; and the IDIMS system is described in an ESL publication, "Interactive Digital Image Manipulation System", dated Apr. 1977.

At the other extreme of complexity, perhaps the structurally simplest of indicium spectrum generators is a biconvex lens and a suitable source of coherent light (see *Introduction to Fourier Optics,* by J. W. Goodman, McGraw-Hill, 1968, pages 83 through 90). As will be obvious to those having ordinary skill in the optical data processing art, however, the indicium spectra produced by such a simple system will not be logarithmically enhanced. If logarithmic enhancement is found necessary or desirable, it may be provided by adding to this simplest indicium spectrum generator a closed-circuit television system of well-known type, modified by inclusion in the video amplifying chain of the receiver of a suitable logarithmic amplifier, which modification is well within the scope of those having ordinary skill in the optical data processing art. Solid state CCD imaging devices which have built-in logarithmic enhancing facilities may be alternatively employed. Where a large number of gray level or intensity values must be provided it may be necessary or desirable to add a shading corrector to the camera of the closed-circuit television system to correct for the effects of shading arising from the light fall-off at the edge of the lens fields (i.e., the biconvex lens field and the camera lens field). (See for example, "Effects of Shading in Images", by Raymond Shear, *Electro-Optical Systems Design,* February, 1978, pp. 24 and 25.)

The expression "logarithmic function" as used herein embraces both the logarithmic function defined by equation (3.3-1) found at page 48 of Gonzalez-Wintz, cited supra, and the simpler logarithmic function defined by eliminating the unity term from said equation (3.3-1), but is not limited to one of those two functions. The simpler of these logarithmic functions, i.e., the one without the unity term, can be used because the optical means generally used to generate indicium spectra, or to pick up indicium data to be used in computer generation of indicium spectra, do not generate perfect spectra or perfect indicium data with perfect zero levels, and thus since some background signal is always present when indicium spectra or indicium data are generated by actual optical equipment it is not necessary in practice to add unity to the basic spectrum element values in order to logarithmically enhance the resulting indicium spectra.

From the above (ESL, Goodman) and many other sources it will be seen that a considerable variety of expedients are available which by themselves or in combination can be used as pattern or indicium spectrum generators.

Figure 2A:
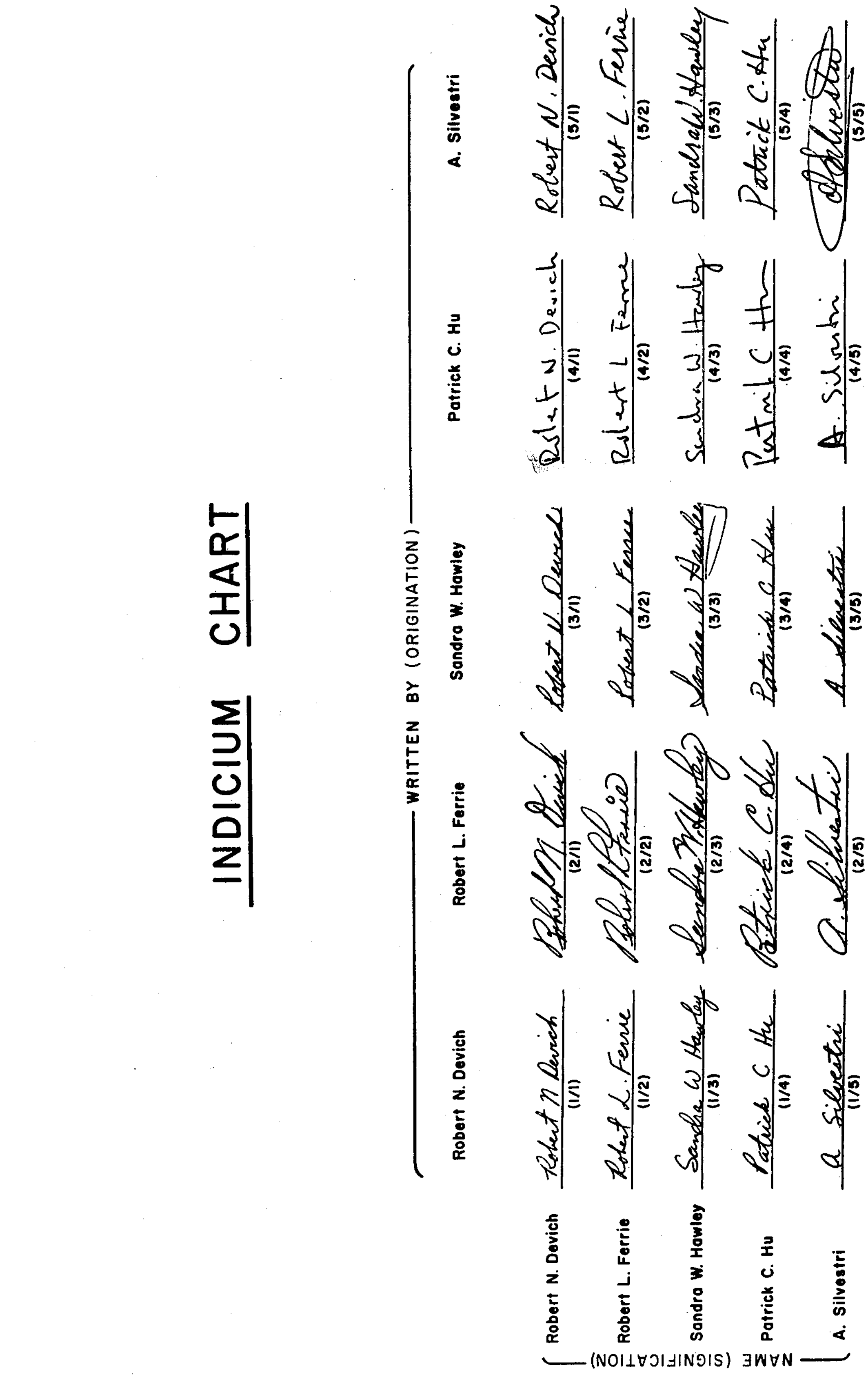
FIG. 2A is an indicium chart of a kind which might be used in constructing an embodiment of my invention.
Figure 28:
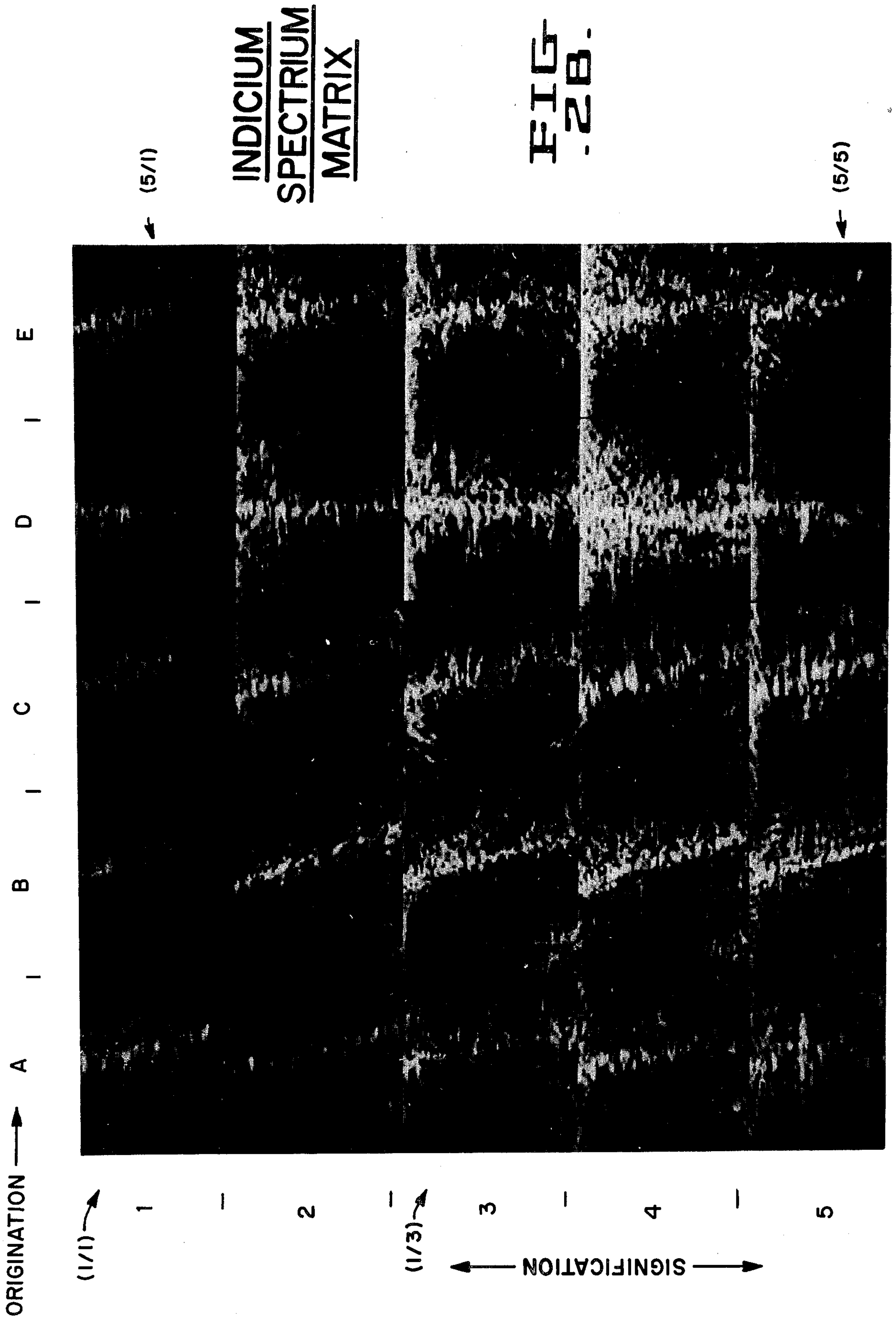

Referring now to FIG. 2A, there is shown an indicium chart consisting of 25 indicia, viz., handwritten signatures, respectively designated (1/1) through (5/5).

In the indicium chart of FIG. 2A all of the names in any one column were written by the same writer. Thus, as may be seen from the legend immediately above column 1 (the lefthand column), all of the names in that column, viz., (1/1), (1/2), (1/3), (1/4), (1/5), were written by Robert N. Devich. Similarly, all of the names in column 2 (second from left), viz., (2/1), (2/2), (2/3), (2/4), (2/5), were written by Robert L. Ferrie.

As will also be understood from the indicium chart of FIG. 2A, each horizontal row consists of five representations of the same name, each representation written by a different person.

Thus, row 1, the top row, viz., (1/1), (2/1), (3/1), (4/1), (5/1), consists of five representations of specimens of the name Robert N. Devich; written by Robert N. Devich, Robert L. Ferrie, Sandra W. Hawley, Patrick C. Hu, and A. Silvestri, respectively.

Similarly, row 4, viz., (1/4), (2/4), (3/4), (4/4), (5/4), consists of five representations or specimens of the name Patrick C. Hu; written by Robert H. Devich, Robert L. Ferrie, Sandra W. Hawley, Partick C. Hu, and A. Silvestri, respectively.

In view of the above, then, it will be seen that indicia (1/1), (2/2), (3/3), (4/4), and (5/5) are signatures, in the sense that in each of these cases the writer was writing his own name; whereas the remainder of the indicia of FIG. 2A are merely handwritten names, but not signatures.

It is to be understood that the set of indicia shown in FIG. 2A is part of a sample of handwriting specimens gathered for use in designing an automatic signature verification device embodying my invention; the method of gathering and juxtaposing these handwriting specimens, whether on paper, in a computer memory, or otherwise, being itself a characteristic feature of my invention.

The word "sample" is used herein in the statistical sense, to denote a sample selected from a larger set, or "population".

In using the methods of my invention to design an automatic signature verification device embodying my invention, the relevant population might, for example, be the handwriting in general, and the signatures in particular, of all of the depositors in a bank or a system of banks.

In applying the methods of my invention in such a case, a sample list of depositors would be randomly selected, and all of the depositors on that list asked to provide handwriting specimens of the type shown in FIG. 2A.

Each selected depositor would be given a card bearing a printed list of the names of the selected depositors, with a signature line provided next to each name, and asked to write each name, including his own, on the signature line next to the printed version of that name.

Thus, in accordance with the methods of my invention, there would be gathered a set of handwritten depositors' names similar to the set of FIG. 2A but considerably more numerous.

For convenience, the thus gathered depositor handwriting specimens might be juxtaposed in the manner indicated in FIG. 2A, although this step will not necessarily be taken in connection with every embodiment of my invention, or every use of the methods of my invention.

As pointed out hereinabove, my invention is not limited in its use to devices and systems for signature verification.

For this reason, the broadest aspects of my invention are described herein in more generalized terminology. A part of that more generalized terminology will now be defined in connection with FIG. 2A.

Each of the handwriting specimens (1/1) through (5/5) of FIG. 2A will now be seen to be an indicium, as that term is defined hereinabove.

All of the indicia in any one column of FIG. 2A will now be understood to have the same "origination", i.e., to have been written by the same person, or more broadly, to have been generated by the same source. The term "origination" is used herein to emphasize the fact that my invention may be used to classify not only handwritten or otherwise manually generated indicia, but may also be used to classify machine-generated indicia, such as typewritten characters.

Further, the term "origination" is used herein to denote that devices of my invention may distinguish between or classify indicia in accordance with the persons or things who generated them, and not in accordance with the mere reproducing means which may have been used to reproduce them.

In the broad terminology used herein to point out the full scope of my invention, all of the indicia in any one column of FIG. 2A are said to be "co-original", because they have the same origination, viz., they were written by the same writer. Indicia from two different columns of FIG. 2A, then, will be said to be "non-co-original".

Since in FIG. 2A all of the indicia in any one row correspond to the same name, all of the indicia in any one row are said to have the same "signification". The term "signification" is used herein in order to avoid the many philosophical nuances with which the term "meaning" is freighted. Cf., the definition of "meaning" given at page 530 of "Webster's New Dictionary of Synonyms", G&C Merriam Company, 1968. It is to be understood, however, that the term "signification" as used herein denotes only the immediate or primary signification or significations of a given indicium, and does not extend to secondary significations such as those attributed to the word "Jerusalem" in the above-cited entry in "Webster's New Dictionary of Synonyms".

Thus, it will be understood that the common signification of all of the indicia in row 4 of FIG. 2A is the name "Patrick C. Hu". For this reason, all of the indicia (1/4), (2/4), (3/4), (4/4), and (5/4) of that row may be said to be "cosignificative", while indicia in two different rows of FIG. 2A are "noncosignificative".

Referring now to FIG. 2B, there is shown a plurality of indicium spectra arranged in the form of a matrix. Such an array of indicium spectra will sometimes be called an "indicium spectrum matrix" herein. As also seen in FIG. 2B, coordinates are provided, similar to ordinary road map coordinates, whereby individual indicium spectra of the spectrum matrix of FIG. 2B may be uniquely identified. For example, the upper lefthand indicium spectrum of FIG. 2B may be seen to be identifiable by the coordinate designation "1A". Similarly, the lower righthand indicium spectrum in FIG. 2B may be seen to be uniquely identifiable by the coordinate designation "5E".

It is further to be understood that each of the indicium spectra of FIG. 2B corresponds to one of the indicia of FIG. 2A, and that the indicia of FIG. 2A are collocated in the same manner as the indicium spectra of FIG. 2B, so that each indicium spectrum of FIG. 2B can be identified with the corresponding indicium of FIG. 2A.

Thus, for example, indicium (2/2) of FIG. 2A corresponds to spectrum indicium 2B of FIG. 2B; and indicium (3/5) of FIG. 2A corresponds to indicium spectrum 5C of FIG. 2B; etc.

Each indicium spectrum of FIG. 2B is a partial digital log Fourier spectrum of the corresponding signature of FIG. 2A, as the expression "digital log Fourier signature spectrum" is defined hereinabove. Thus, indicium spectrum 1B of FIG. 2B is a partial digital log Fourier spectrum of signature (2/1) of FIG. 2A.

As will be evident to those having ordinary skill in the optical data processing art, informed by the present disclosure, it will be desirable in certain embodiments of my invention to employ indicium spectrum generators which are capable of operating at substantial speeds without resort to coherent light sources.

One such indicium spectrum generator is shown and described hereinbelow in connection with FIGS. 3, 4, 5A, 5B, and 5C.

Figure 4:
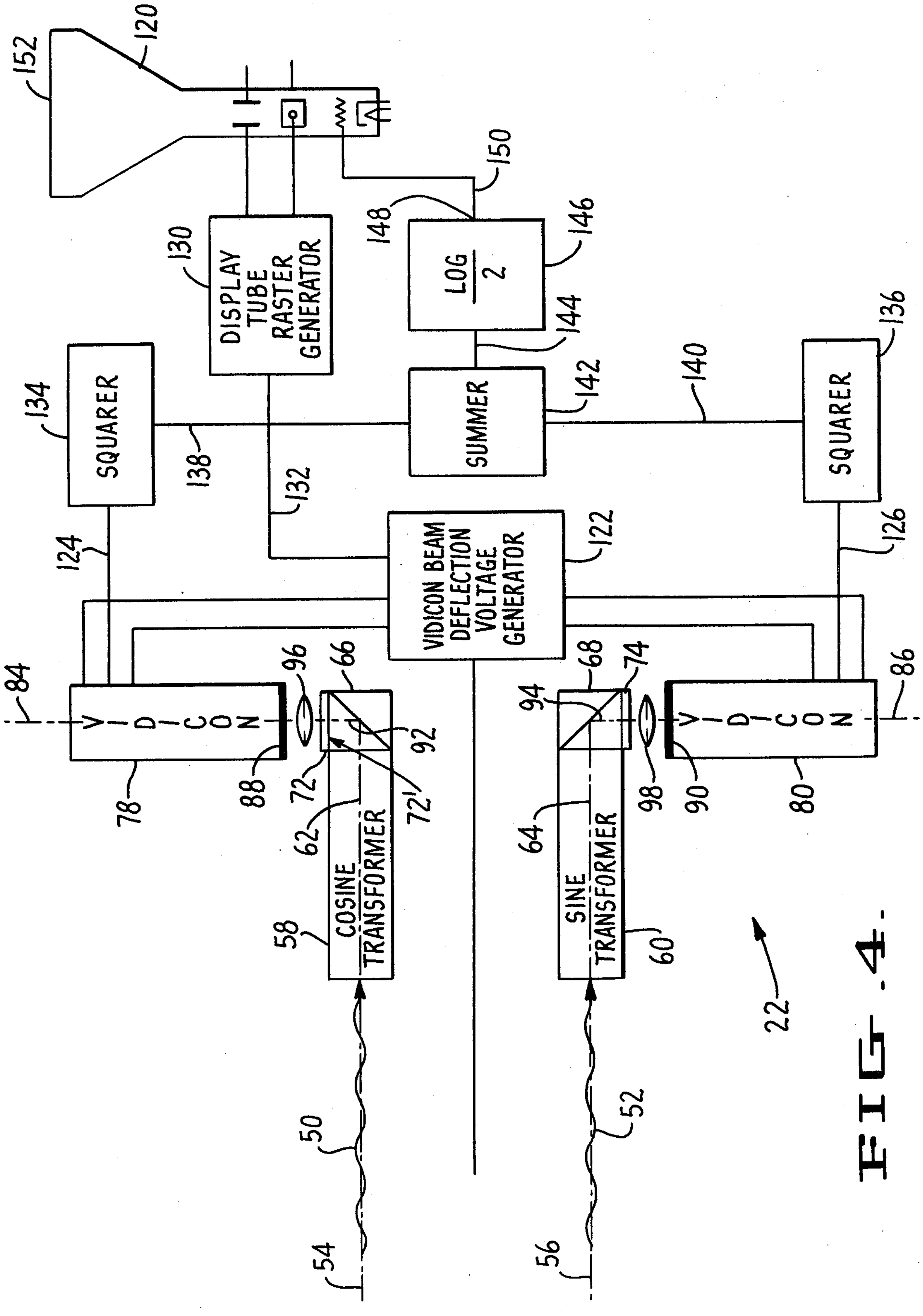

Referring now to FIG. 3, there is shown the optical pickup unit 20 of this indicium spectrum generator, which functions to supply duplicate images of the indicium being processed to the respective sine and cosine optical transformers of the transforming and enhancing circuit 22 of FIG. 4.

It is assumed in FIG. 3 that a moving belt 24, provided with a plurality of document carriers, 26, 28, 30, each of which contains a document bearing an indicium the spectrum of which is to be generated, has halted in such a position that a selected indicium on the document in document carrier 28 is in registration with the principle axis 32 of optical pickup unit 20.

Optical pickup unit 20 further comprises two light sources 34, 36. Light sources 34 and 36 are incoherent light sources, though they may be coherent light sources in some embodiments.

The provision of suitable uniform incoherent light sources is discussed in Appendix III of *Non-Coherent*

*Optical Processing,* by G. L. Rogers, John Wiley and Sons, New York, 1977, and will not be discussed here. That text will hereinafter be referred to as "Rogers".

An indicium 40 on a document in document carrier 28 is imaged by a lens system 42 into a two-way beam splitter 44 of wellknown type. Beam splitter 44 directs bundles of light rays carrying substantially identical images of indicium 40 into two beam splitters 46, 48, which serve to deviate said bundles of light rays by 90°.

Two light ray bundles 50, 52 emerge, respectively, from 90° deviation beam splitters 46, 48, carrying substantially identical images of indicium 40 to the transforming and enhancing circuit 22 of FIG. 4.

Returning to FIG. 3, it will be seen that 90° deviation beam splitters 46 and 48 can be thought of as having respective optical output axes 54, 56, along which lie twice-reflected light rays corresponding to a light ray collinear with the principle optical axis 32 of lens system 42.

Before discussing in detail the transforming and enhancing circuit 22 of FIG. 4, it should be recalled that light sources 34, 36 of FIG. 3 are noncoherent or incoherent light sources.

The optical unit 20 and the transforming and enhancing circuit 22 of FIGS. 3 and 4, respectively, are adapted to cooperate to produce logarithmic functions of Fourier spectra of indicia by the use of incoherent light because it is expected that a principal field of application of my invention will be its use in connection with bank checks, many of which are printed on a fairly low grade of unfilled paper, often provided with a "scenic" or other imprint.

Given the matte surfaces of bank check papers, altered in not fully determined ways by being thus imprinted, it cannot be determined a priori whether sufficiently good images can be produced from all bank check surfaces by reflected coherent light.

It is for this reason that optical pickup unit 20 and summing and enhancing circuit 22 are disclosed herein as incoherent light devices.

It will be obvious to those having ordinary skill in the optical data processing art, informed by the present disclosure, that the use of coherent light is to be preferred in many embodiments of my invention, since thereby the amount of equipment used is greatly reduced, and thus the cost of such embodiments, along with their complexity, is greatly reduced.

For example, in a coherent light system embodying my invention beam splitters 44, 46, 48 could be eliminated; the sine transformer and cosine transformer of FIG. 4 could be replaced by a simple biconvex lens (see Goodman text cited supra); and one vidicon tube could be eliminated from summing and enhancing circuit 22 of FIG. 4, along with the two squarers and the summer.

It is presently anticipated that coherent light may be usable in some bank systems embodying my invention, although resort may have to be had to some of the methods discussed in "Effects of Coherence of Imaging Systems", *Journal of the Optical Society of America,* Volume 56, No. 8, August, 1966 by Philip S. Considine. It is to be understood that all systems embodying my invention, whether employing coherent or noncoherent light, fall within the embrace of my invention.

Referring now to FIG. 4, it will be seen that transforming and enhancing circuit 22 comprises a "cosine transformer", or noncoherent light Fourier optical cosine transformer, 58, and a "sine transformer" or noncoherent light Fourier optical sine transformer 60.

Such Fourier optical sine and cosine transformers for use with coherent light are well-known to those having ordinary skill in the art. See, for example, U.S. Pat. No. 3,669,528, issued to John M. Richardson on June 13, 1972, and Chapter 5 of the Rogers text, cited supra, and the sources therein cited.

As will be evident to those having ordinary skill in the optical data processing art, other means than the means of FIG. 3 for providing input indicia image signals to Fourier optical transformers 58 and 60 of FIG. 4 may be provided by those having ordinary skill in that art without the exercise of invention.

For example, it may be desirable to halt belt 24 twice during the generation of each indicium spectrum, thus making it possible to successively expose the respective input portions of the Fourier optical transformers 58, 60 to indicium 40, employing the well-known storage property of the vidicon (80, FIG. 4), to retain the image derived from one Fourier optical transformer (60) until the image derived from the other (58) is picked up (by vidicon 78) when belt 24 halts for the second time.

As seen in FIG. 4, the principal optical axis of Fourier optical cosine transformer 58 is designated by the reference numeral 62, and the principal optical axis of Fourier optical sine transformer 60 is designated by the reference numeral 64. As also indicated in FIG. 4, optical output axis 54 of beam splitter 46 (FIG. 3) is collinear with optical axis 62 of cosine transformer 58, and optical output axis 56 of beam splitter 48 (FIG. 3) is collinear with optical axis 64 of sine transformer 60.

As further seen in FIG. 4, a 90° deviating beam splitter 66 is closely juxtaposed to the optical output end of cosine transformer 58, and a 90° deviating beam splitter 68 is closely juxtaposed to the optical output end of sine transformer 60. Since, as may be seen from FIG. 4, beam splitters 66 and 68, like beam splitters 46 and 48 (FIG. 3), serve only to deviate impingent light beams by 90°, the reflecting surfaces of these beam splitters may be totally opaque, or prism or mirror arrangements may be substituted therefor.

Closely juxtaposed to the optical output surface of beam splitter 66 is an optical element 72 which will herein be called a "pixel averager", and will be described hereinbelow in connection with FIGS. 5A through 5C. Similarly, a substantially identical pixel averager 74 is closely juxtaposed to the optical output surface of beam splitter 68.

As further seen in FIG. 4, a vidicon camera tube 78 is located closely adjacent pixel averager 72, and a vidicon camera tube 80 is positioned closely adjacent pixel averager 74. Vidicon camera tube 78 has an axis of symmetry 84 which passes through the center of its photocathode, and vidicon camera tube 80 has an axis of symmetry 86, which passes though the center of its photocathode, both axis of symmetry 84 and axis of symmetry 86 being perpendicular to the photocathodes of their respective vidicon camera tubes.

Vidicon tube 78 may, in the well-known manner, be provided with an opaque mask 88 having a rectangular central opening which defines its picture format. When vidicon tube 78 is provided with such a mask 88, vidicon tube 80 will be provided with a similar mask 90, the rectangular openings in the masks 88 and 90 being of the same area and aspect ration and both of said rectangular openings being centered about the axes of symmetry 84, 86 of their respective vidicon tubes.

Beam splitters 66 and 68 may be thought of as having respective optical output axes 92 and 94. Optical output axis 92 of beam splitter 66 is collinear with the reflection of a ray directed along axis 62 of cosine transformer 58, and optical output axis 94 of beam splitter 68 is collinear with the reflection of a ray directed along axis 64 of sine transformer 60.

If it is desired that the point of symmetry, i.e., the point of zero spatial frequency in all directions, of the indicium spectrum produced by the indicium spectrum generator comprising the circuit of FIG. 4 be located in the center of the output image of the indicium spectrum generator, beam splitter 66 and vidicon 78 will be so mounted that their respective axes 92 and 84 are collinear, and beam splitter 68 and vidicon 80 wll be so mounted that their respective axes 94 and 86 are collinear.

If, on the other hand, as in the present preferred embodiment, it is desired that the central point or point of symmetry of the indicium spectrum image produced by that indicium spectrum generator be located at the center of one edge of the indicium spectrum image, as is the case with indicium spectrum image 10 of FIG. 1, then axis 92 of beam splitter 66 will be made to pass perpendicularly through the center of one edge of said rectangular central opening in mask 88, and axis 94 of beam splitter 68 will be made to pass perpendicularly through the center of the corresponding edge of said rectangular central opening in mask 90. This can be achieved in several ways which will be obvious to those having ordinary skill in the art, e.g., relatively displacing the axes 84, 86 of vidicons 78 and 80 in opposte directions in a plane containing axes 62, 64, 84, and 86, etc., and thus no such displacement or the like is shown in FIG. 4.

A lens 96 is provided for imaging the near inner faceplate face of pixel averager 72 onto the photocathode of vidicon 78, and a lens 98 is provided for imaging the near inner faceplate face of pixel averager 74 onto the photocathode of vidicon 80. The near inner faceplate faces of pixel averagers 72, 74 correspond to inner faceplate face 114 of FIG. 5A.

Figure 5A:
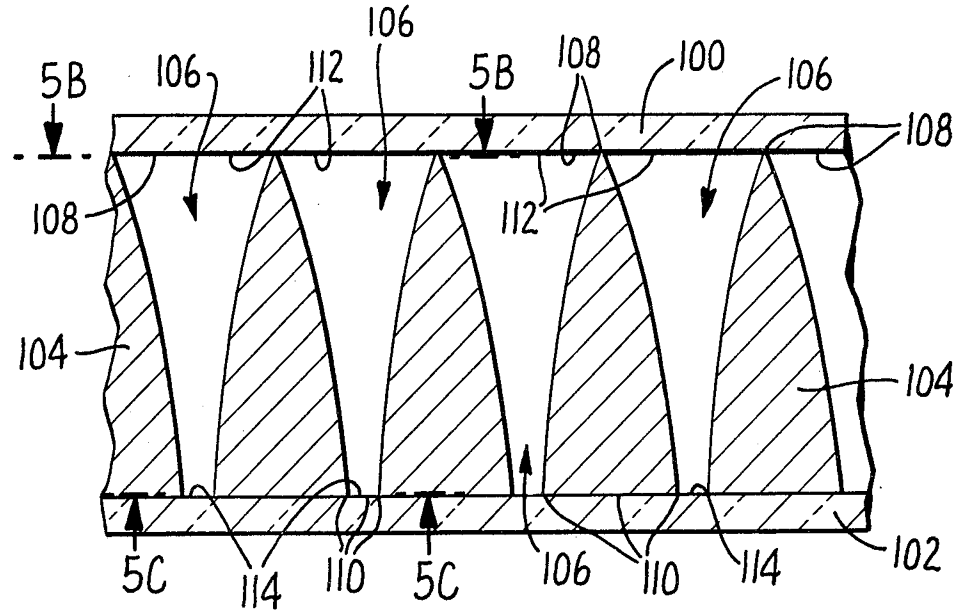
Figure 5B:
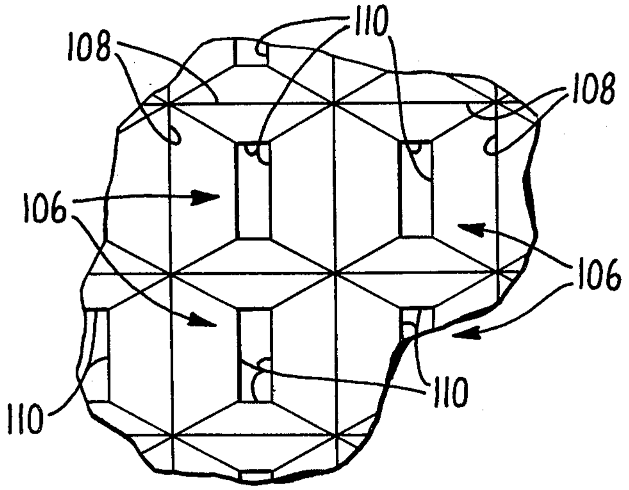
Figure 5C:
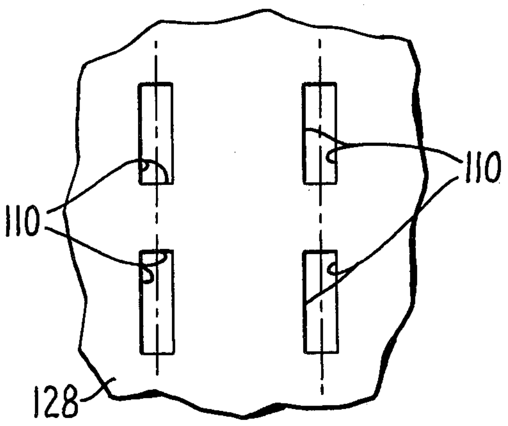

Going now to FIGS. 5A through 5C it will be seen that the pixel averager of the present embodiment of my invention, of which pixel averagers 72 and 74 are substantially identical specimens, consists of a glass face plate 100, a second glass face plate 102, and a perforated or foraminous structure 104 disposed therebetween.

As may be seen by comparison of FIGS. 5A and 5B, the perforations or foraminae 106 in body 104 are generally tapered, narrowing from their open ends at plate 100 to their open ends at plate 102.

As may also be seen by comparison of FIGS. 5A and 5B, the peripheries 108 of the open ends of perforations 106 adjacent plate 100 are so large as to necessarily be substantially coincident, while the peripheries 110 of the open ends of perforations 106 adjacent plate 102 are much smaller.

Thus, while the common sides of the peripheries 108 of the adjacent upper, large perforation openings are substantially coincident, the peripheries 110 of the adjacent lower, small perforation openings are considerably remote from each other, the area of each lower (small) opening surrounded by a periphery 110 being less than one-third the area of the corresponding upper (large) opening bounded by a periphery 108.

Plate 100 is provided with a frosted or diffusing surface on its inner face 112, plate 102 is provided with a frosted or diffusing surface on its inner face 114, and the walls of the perforations 106 are made highly reflective.

As will now be evident to those having ordinary skill in the optical data processing art, the pixel averagers of the present indicium spectrum generator serve to subdivide a light image impingent on diffusing face 112 into a plurality of pixel light bundles, and to concentrate the light of each such bundle, at the same time substantially averaging it, so that the light emitted by each part of diffusing surface 114 bordered by a periphery 110 is substantially proportional to the average illumination falling upon the corresponding part of diffusing surface 112 bordered by a corresponding periphery 108.

Returning to FIG. 4, it will be seen that the combination of pixel averager 72 and lens 96 serve to impine upon the photocathode of vidicon 78 a pattern of isolated light islands (herein called "pixels") the intensity of each of which is substantially proportional to the average light intensity falling upon a corresponding part of diffusing surface 72' of pixel averager 72, and that the combination of pixel averager 74 and lens 98 do the same for vidicon 80.

As will be apparent to those having ordinary skill in the art, informed by the present disclosure, the vidicon 78 and 80 and their respectively associated pixel averagers 72 and 74 may in some embodiments of my invention be replaced by solid state devices of the kind sometimes called "CCD cameras", "optical image digitizers", "optical data digitizers", or "solid state video cameras", such as are made by EG&G Reticon, 345 Portrero Ave., Sunnyvale, Calif., EMR Photoelectric, Princeton, N.J., and Periphicon, Beaverton, Ore. As is also well known, some of these devices incorporate image enhancement facilities; e.g., the digital image memory/-processors made by the Quantex Corporation of Sunnyvale, Calif.

The intensity value or gray level value of each pixel imaged upon the photocathode of vidicon 78 will, of course, be determined by the output image of Fourier cosine transformer 58, which in turn depends upon the configuration of the indicium 40 presented to optical pickup unit 20 (FIG. 3).

Similarly, the intensity value or gray level value of each pixel imaged upon the photocathode of vidicon 80 will be determined by the output image of Fourier sine transformer 60, which in turn depends upon the configuration of the indicium 40 presented to optical pickup unit 20 (FIG. 3).

As is well known to those having ordinary skill in the optical data processing art, a digital image of a complete Fourier transform can be produced by taking the square roots of the sums of the squares of the intensity values or gray level values of the corresponding pixels of the digital images of the corresponding sine and cosine transforms, respectively, and displaying the resulting array of sum-of-the-squares pixel intensity values or gray level values in the same juxtaposition as the corresponding pixels of the digital sine and cosine transform images. (Cf., Rogers, cited supra.)

As will be evident to those having ordinary skill in the art in view of the following discussion, this procedure is carried out by the circuit shown in the central portion of FIG. 4, which circuit also provides logarithmic enhancement, and thus a partial digital logarithmic function of the Fourier spectrum of indicium 40 is displayed on display tube 120 of FIG. 4.

Since pixel averager 72 and pixel averager 74 each constitute a $64 \times 64$ array of substantially identical perforations (106, FIG. 5B), and since these arrays are carefully maintained in the same relative positions with respect to their corresponding vidicon axes 84, 86, and in the same orientation with respect to their corresponding transformer axes 62, 64, and further since the scanning beams of vidicons 78 and 80 are swept in raster fashion by the same raster signal derived from a single vidicon beam deflection voltage generator 122, which is a free-running deflection voltage generator of well-known type, it follows that the simultaneously occurring instantaneous signals on vidicon output lines 124 and 126 (FIG. 4) will be derived from either (1) "background", corresponding to the pixel averager background area 128 as shown in FIG. 5C, or (2) the corresponding parts of the corresponding pixels imaged respectively on the photocathodes of vidicon 78 and 80.

More particularly, since the sweep voltages provided by deflection voltage generator 122 cause the scanning beams of vidicons 78 and 80 to sweep their associated photocathodes in synchronism, the amplitudes of the simultaneously occurring signals on vidicon output lines 124 and 126 correspond to the respective intensities of the light impinging on the corresponding points of the photocathodes of the vidicons 78 and 80.

Thus, if the perforations of pixel averager 72 are assigned location code numbers by analogy to the pixel location code numbers of FIG. 1, as seen from the position of vidicon 78, and the perforations of carefully collocated pixel averager 74 are assigned such code numbers, but as seen from the position of vidicon 80, then during each raster scan the scanning beam of vidicon 78 will first begin to traverse the photocathode area corresponding to perforation 0/0 of pixel averager 72 at the same time that the scanning beam of vidicon 80 first begins to traverse the photocathode area corresponding to perforation 0/0 of pixel averager 74; the scanning beam of vidicon 78 will first begin to traverse the photocathode area corresponding to perforation 16/16 of pixel averager 72 at the same time that the scanning beam of vidicon 80 first begins to traverse the photocathode area corresponding to perforation 16/16 of pixel averager 74; etc. Thus, the signal on output line 124 can be said to at all times correspond to the signal on output line 126.

A raster synchronizing signal produced by vidicon beam deflection voltage generator 122 is supplied to display tube raster generator 130 via signal line 132, whereby the operation of display tube raster generator 130 is maintained in synchronism with the operation of vidicon beam deflection voltage generator 122, and thus the writing electron beam of display cathode ray tube 120 is kept in synchronism with the scanning beams of vidicons 78 and 80. As will be evident to those having ordinary skill in the optical data processing art, it may be found desirable to provide shading correction means for correcting the signals on lines 124 and 126, such as the shading correction means described in the above-cited article of Raymond Shear, especially when the indicium spectrum generator of FIGS. 3 through 5 is used in an embodiment of my invention in which it is desirable to employ a large number of pixel gray levels.

The output signals of vidicons 78 and 80, on signal lines 124 and 126, respectively, corrected for shading if such correction is found desirable, are applied to the input terminals of squarers 134 and 136, respectively.

Squarers 134 and 136 may be high-speed squaring devices such as QK-256 or QK-329 beam deflection squaring tubes (See *Electronics*, February, 1955, pages 160 through 163, and *Electronics*, August, 1950, pages 122, 174, 175, and 176). Alternatively, it may be desired to employ for this purpose a pair of electronic arbitrary function generators such as the function generators of U.S. Pat. Nos. 2,907,888, and 3,037,123.

As is well-known to those having ordinary skill in the art, these devices are all free-running analog devices which produce on an output lead an analog voltage proportional at all times to the square of an analog voltage on an input lead, some operating at extremely high speeds.

Thus, it will be understood that squarer 134 produces on its output lead 138, when vidicon 78 is scanning any pixel image on its photocathode, an analog voltage proportional to the square of the intensity value or gray level value of that pixel image.

Similarly, squarer 136 produces on its output lead 140, when the scaning beam of vidicon 80 is simultaneously transiting the corresponding pixel image on its photocathode, an analog voltage which is proportional to the square of the intensity value or gray level value of that corresponding pixel image.

Since the corresponding pixel images on the respective photocathodes of vidicons 78 and 80 are scanned simultaneously, the summer 142 shown in FIG. 4 will simultaneously receive, on its respective input lines 138 and 140, the abovesaid two analog voltages proportional to the squares of the intensity values or gray level values of the corresponding pixel images on the respective photocathodes of vidicons 78 and 80.

(As may be deduced from FIGS. 2 and 4, each pixel image on each vidicon (78, 80) photocathode is scanned several times during each raster scan. Thus, analog voltages which are proportional to the squares of the intensity values or gray level values of each pair of corresponding pixel images on the respective vidicon photocathodes will be produced several times for each corresponding pair of pixels during each raster scan.)

Analog summing means suitable for use as summer 142 will be provided by those having ordinary skill in the art without the exercise of invention. If the above-suggested beam deflection tubes are used for the squares 134 and 136, the high output impedance thereof will make it possible to use a very simple resistive analog summer for summer 142. Alternatively, a more elaborate summer, such as a computing tube summing arrangement of the kind disclosed in U.S. Pat. No. 2,993,645, issued to W. J. Spaven on July 25, 1961, may be employed.

For each corresponding pair of pixels or pixel images on the respective photocathodes of vidicons 78 and 80 being simultaneously scanned, then, the analog output voltage on output line 144 of summer 142 will be proportional to the sum of the squares of the intensity values or gray level values of those two pixels or pixel images.

As seen in FIG. 4, output lead 144 of summer 142 provides the input signal to the half-log function generator 146 shown in FIG. 4.

Half-log function generator 146 may, for example, be an electronic arbitrary function generator such as one of those disclosed in the above-cited U.S. Pat. Nos. 2,907,888, and 3,037,123, or may be a beam deflection tube of the type disclosed in my U.S. Pat. No. 2,643,289, issued on June 23, 1953, and more particularly one of the photoelectric-beam deflection tubes of that patent in which the optical wedges are graduated in accordance with the half-log function.

All of these devices, like squarers 134 and 136, and summer 142, are free-running analog devices, and thus the signal produced at output terminal 148 of half-log generator 146 whenever a corresponding pair of pixel images are being scanned on the respective photocathodes of vidicons 78 and 80 will be a logarithmic function of the square root of the sum of the squares of the intensity values or gray level values of those two scanned pixel images.

Since, as seen in FIG. 4 and explained hereinabove, display tube raster generator 130 is synchronized with vidicon beam deflection voltage generator 122, and thus causes the electron beam of display tube 120 to move in synchronism with the scanning beams of vidicons 78 and 80, and since the output signal of half-log generator 146 is applied directly to signal line 150 which supplies signals to the beam intensity control grid of display tube 120, it will now be understood by those having ordinary skill in the optical data processing art that a partial "insular pixel" digital image of a logarithmic function of the Fourier spectrum of indicium 40 will be displayed as an intensity function on screen 152 of display tube 120 so long as indicium 40 is presented to optical pickup unit 20 (FIG. 3). (Generators 122 and 130 must, of course, generate the same type of raster scan, e.g., a progressive one-pass or non-interlaced raster scan.)

Thus, it will now be understood by those having ordinary skill in the art that the indicium spectrum generator of FIGS. 3 through 5 functions to produce on display screen 152 (FIG. 4) a spectrum of indicium 40 (FIG. 3), and more particularly a partial digital log Fourier spectrum of indicium 40, displayed as an intensity function.

If, then, indicium 40 is a handwritten signature, the indicium spectrum generator of this embodiment will serve to display as an intensity function upon display screen 152 a partial "insular pixel" digital log Fourier signature spectrum corresponding to that signature.

Figure 2C:
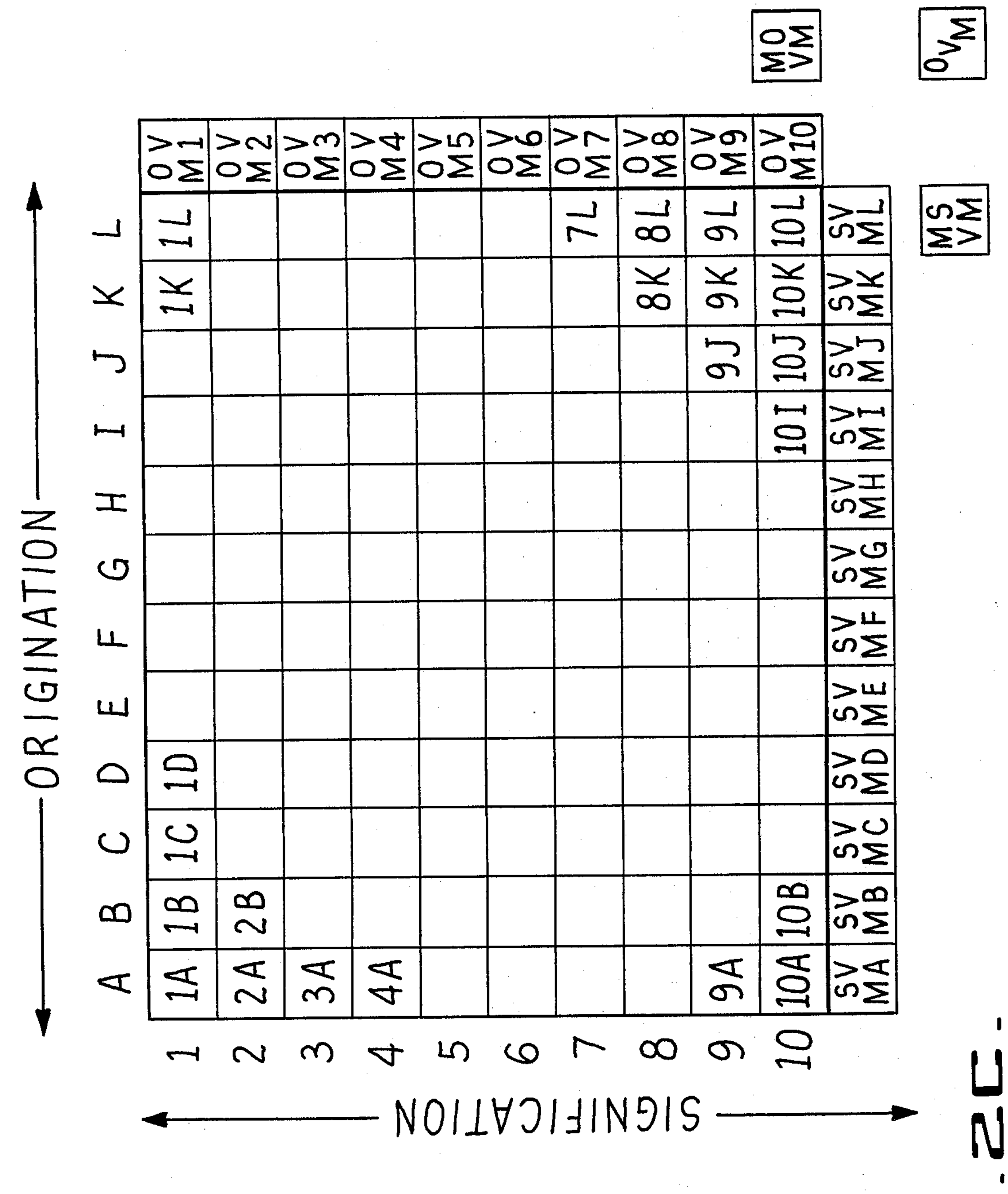
FIG. 2C illustrates the methods of my invention for determining the unclassified pixel constellations of indicum classification devices embodying my invention.

Referring now to FIG. 2C, the methods and apparatus of my invention for determining the pixel detector constellation, i.e., the coordinates of the pixels of the unclassified indicium spectra whose gray level values or intensity values are to be sensed by the pixel detectors of a particular indicium classification device embodying my invention, will be described.

FIG. 2C comprises a two-dimensional array or matrix of elements identified by the coordinate designations 1A, 1B, 1C . . . 10J, 10K, 10L.

The matrix of FIG. 2C is similar to the matrix of FIG. 2B in that each element of the matrix of FIG. 2C should be regarded as an indicium spectrum having the origination and signification indicated by the two components of the coordinate designation of that element. E.g., element 1A of FIG. 2C might, in a particular embodiment of my invention, have the origination "Robert N. Devich", and the signification "Robert N. Devich", in which case the corresponding indicium spectrum would be indicium spectrum 1A of FIG. 2B.

Ignoring for the moment the matter outside the two heavy lines of FIG. 2C, let it be considered that the diagram of FIG. 2C represents the matrix of indicium spectra from which the unclassified pixel constellation and the classification (signification) value sets of a handwritten numeral classifying device of my invention (160, FIG. 6) are to be determined.

In that case, indicium spectrum 1A would be derived from a numeral 1 written by a writer designated as "A", indicium spectrum 2A would be derived from a numeral 2 written by writer "A", indicium spectrum 2B would be derived from a numeral 2 written by a writer designated "B", indicium spectrum 9J would be derived from a numeral 9 written by a writer designated as "J", indicium spectrum 10A would be derived from a numeral 0 written by writer "A", indicium spectrum 10I would be derived from a numeral 0 written by a writer designated as "I", etc., all by means of the same indicium spectrum generator used in numeral reader 160, or its functional equivalent.

In accordance with my invention, the writers A, B, C, etc., are selected for their different handwriting styles, e.g., such that writer A habitually writes a fully developed numeral 1 such as shown in FIG. 10A while other ones of the writers habitually employ other styles of the numeral 1 such as shown in FIGS. 10B, 10C, and 10D. Thus, one or more of the writers may be selected as individuals who habitually employ the "European" style of handwritten numerals, including the "European" numeral 1 of FIG. 10D and the "European" numeral 7 of FIG. 10G. At least one of the writers A, B, etc., of FIG. 2C will be a writer who habitually employs a common, plain and simple style of writing the ten Arabic numerals, such as the style shown in FIG. 10H.

Further, in accordance with my invention it may be alternatively decided to "synthesize" the handwritten numerals from which the indicium spectra of FIG. 2C are generated, e.g., by having a single individual write or draw all of the indicia from which the indicium spectra of FIG. 2C are derived, making sure that that individual writes or draws a suitably wide variety of handwritten numerals, including all of those shown in FIG. 10. By this alternative method, especially for non-critical applications of my invention, the number of columns in FIG. 2C may be reduced, and thus the steps of statistical analysis based thereupon, which are now to be described, may be reduced in execution time and cost.

Returning now to FIG. 2C, it will be seen that at the righthand end of the top row thereof there is found a rectangle labelled OVM1.

Rectangle OVM1 represents a mathematical construct of my invention which I call "origination variance matrix 1" of the indicium spectrum matrix of FIG. 2C.

OVM1 may be a digital image made up of the same number of pixels, disposed in the same number of rows and columns, as the pixels of any indicium spectrum of FIG. 2C.

The gray level value or intensity value of each pixel of OVM1 is proportional to the variance of the gray level values or intensity values of the corresponding pixels of the indicium spectra 1A through 1L of the top row of the matrix of FIG. 2C.

Thus, for example, the gray level or intensity value of pixel 5/6 of OVM1 is proportional to the numerical value of the variance of the gray level values or intensity values of the pixels 5/6 of indicium spectra 1A, 1B, 1C . . . 1K, 1L of FIG. 2C.

Each of the origination variance matrices OVM1 through OVM10 is derived in the same manner from its corresponding row of image spectra, OVM2 being derived from spectra 2A through 2L, OVM3 being derived from spectra 3A through 3L, etc.

As will be understood by those having ordinary skill in the art, the proportionality factor between the gray level values of the respective pixels of the origination variance matrices and the corresponding numerical values of variance must be maintained the same throughout the derivation of all of the origination variance matrices.

As will also be obvious to those having ordinary skill in the art, informed by the present disclosure, other measures of scatter or dispersion may sometimes be used in carrying out my invention.

As will also be evident to those having ordinary skill in the art, informed by the present disclosure, the respective origination variance matrices need not be actually represented as digital images, but rather may be represented as numerical tabulations when the method of machine design of my invention is carried out by hand, or may be represented only in the memory of a computer or data processing system, when the machine design method of my invention is carried out by means of an image processing system, such as the IDIMS system referred to hereinabove.

Returning to FIG. 2C, it will be seen that an additional rectangle is located at the bottom of each column of the indicium spectrum matrix thereof, these additional rectangles being identified by the respective legends "SVMA", "SVMB", etc.

These additional rectangles represent the mathematical constructs of may invention which I call the "signification variance matrices" of the respective columns of the indicium spectrum matrix of FIG. 2C.

As can be seen in FIG. 2C, signification variance matrix SVMA lies at the bottom of indicium spectrum matrix column A, signification variance matrix SVMB lies at the bottom of indicium spectrum matrix column B, etc.

In accordance with my invention, the respective signification variance matrices are derived from their associated (same letter) columns in the same way in which the origination variance matrices are derived from their associated (same number) rows.

Thus for example, the gray level value of intensity value of pixel 9/10 of signification variance matrix SVMB will be proportional to the numerical value of the variance of the gray level values or intensity values of the corresponding pixels (9/10) of each of the indicium spectra 1B through 10B of column B of the indicium spectrum matrix of FIG. 2C.

Returning to FIG. 2C, it will be seen that a rectangle labelled "MOVM" is situated near the rectangle OVM10 which represents origination variance matrix 10.

The rectangle MOVM represents a mathematical construct of my invention which I call the "mean origination variance matrix".

The mean origination variance matrix may be a digital image consisting of the same number of pixels as digital image OVM1, which pixels are disposed in the same number of rows and columns as the pixels of digital image OVM1.

The gray level value or intensity value of each pixel of MOVM is proportional to the mean of the gray level values or intensity values of the corresponding pixels of all of the origination variance matrices.

Thus, for example, the gray level value or intensity value of pixel 7/8 of the mean origination variance matrix MOVM of FIG. 2C is proportional to the mean of the gray level values or intensity values of the pixels 7/8 of each of the origination variance matrices OVM1 through OVM10, the proportionality factor being kept constant for all pixels of MOVM.

Referring again to FIG. 2C, it will be seen that a rectangle labelled "MSVM" is located immediately below the rectangle designated SVML.

The rectangle MSVM represents a mathematical construct of my invention which I call the "mean signification variance matrix" of the indicium spectrum matrix of FIG. 2C.

The mean signification variance matrix MSVM is derived from the signification variance matrices SVMA through SVML in the same way in which the mean origination variance matrix is derived from the origination variance matrices OVM1 through OVM10.

MSVM may be a digital image having the same number of pixels, collocated in the same way, as the pixels of SVMA or MOVM.

Thus, the gray level value or intensity value of each pixel of MSVM will be proportional to the mean of the gray level values or intensity values of the corresponding pixels of each of the signification variance matrices SVMA through SVML.

Thus for example, the gray level value or intensity value of pixel 5/10 of the mean signification variance matrix MSVM of FIG. 2C will be proportional to the mean of the gray level values or intensity values of the pixels 5/10 of each of the signification variance matrices SVMA through SVML, the proportionality factor being kept constant for all pixels of MSVM.

As will be evident to those having ordinary skill in the art, taught by the present disclosure, MOVM and MSVM need not be represented in graphical form as digital images, but may be represented in non-visible form, as in the memory means of an image processing system such as the IDIMS image processing system referred to hereinabove.

Also, as will be evident to those having ordinary skill in the art, informed by the present disclosure, it may be convenient when employing such an image processing system in designing a particular embodiment of my invention to store in the memory thereof only a few of the largest gray level values or intensity values, i.e., mean variance values, which go to make up MOVM and MSVM. Such an alternative technique falls within the embrace of my invention.

Returning to FIG. 2C, it will be seen that an additional rectangle is located at the extreme lower right-hand corner thereof; this additional rectangle being identified by the legend OVM.

The rectangle OVM represents the mathematical construct of my invention which I call the "overall variance matrix" of the indicium spectrum matrix of FIG. 2C.

OVM may be a digital image made up of the same number of pixels, collocated in the same way, as the pixels of each indicium spectrum 1A . . . 10L of FIG. 2C.

The gray level value or intensity value of each pixel of OVM is proportional to the variance of the gray level values or intensity values of the corresponding pixels of all of the indicium spectra 1A . . . 10L of FIG. 2C.

Thus, for example, the gray level value or intensity value of pixel 5/9 of OVM is proportional to the numerical value of the variance of the gray level values or intensity values of the pixels 5/9 of all of the indicium spectra 1A . . . 10L of FIG. 2C.

OVM will find a principal application in automatic handwritten signature verification devices embodying my invention.

Considering now the nature of the mean signification variance matrix MSVM, as defined hereinabove, it will be evident to those having ordinary skill in the art, informed by the present disclosure, that the low gray level value or intensity value pixels thereof correspond to sets of corresponding indicium spectrum pixels which vary little if any from signification to signification, i.e. from row to row in FIG. 2C, or from numeral to numeral in the handwritten numeral classifier of reader referred to hereinabove.

On the other hand, it will also be evident that the high gray level value or intensity value pixels of the mean signification variance matrix MSVM correspond to sets of corresponding indicium spectrum pixels whose gray level or intensity values vary considerably from signification to signification, i.e., from row to row in FIG. 2C, or from numeral to numeral in the handwritten numeral reader referred to hereinabove.

Thus, in handwritten numeral classifier or reader 160 the pixel detectors associated with the indicium spectrum generator to which the unclassified indicia are presented will be located (the unclassified pixel constellation will be determined) in accordance with the locations of the highest gray level value or intensity value pixels of the mean signification variance matrix (MSVM), derived as described hereinabove in connection with FIG. 2C.

In other words, when designing a handwritten numeral reader of the type of FIG. 6 a sample of handwritten numerals will be obtained, or synthesized, in the manner described hereinabove, the spectra of these handwritten numerals will be generated as described hereinabove, and these spectra will be arrayed as shown in FIG. 2C. (It will be understood, of course, that the "arraying" step, may take place within an image processing system such as the above-identified IDIMS image processing system.) The corresponding mean signification variance matrix (MSVM) will then be derived from that array of handwritten numeral (indicium) spectra, and that mean signification variance matrix will be inspected (preferably automatically by the image processing system) to determine the locations of its highest gray level value or intensity value pixels, these pixels being called the "highest signification variance pixels" and their locations being called the "highest signification variance pixel locations".

The number of highest signification variance pixels or pixel locations thus selected may be thirty, although it will be understood that in some applications of may invention other numbers of highest signification variance pixels and pixel locations may be selected by successive statistical trials, or computer modelings, in which the actual number of highest signification variance pixel locations used in carrying out my invention is determined in accordance with the corresponding statistical confidence limits determined in well-known manner.

As will now be evident to those having ordinary skill in the art, informed by the present disclosure, the pixel value detectors of handwritten numeral classifier 160 (FIG. 6) will be juxtaposed in pixel intensity value detecting relation to the selected highest signification variance pixel locations of the display means of the indicium spectrum generator thereof, i.e., to the pixels of the indicium spectrum generator display means corresponding to or having the same pixel location codes x/y as the highest signification variance pixels selected in accordance with the MSVM as just described. Thus, the limited number (thirty) of pixel value detectors in handwritten numeral classifier 160 will be so disposed as to detect the gray level values or intensity values of the highest signification variance pixels of the spectra of the indicia (numerals) to be classified thereby. In keeping with the definitions given above, the pixels juxtaposed to these detectors will collectively be called the "unclassified pixel constellation" of this numeral reader.

Figure 6:
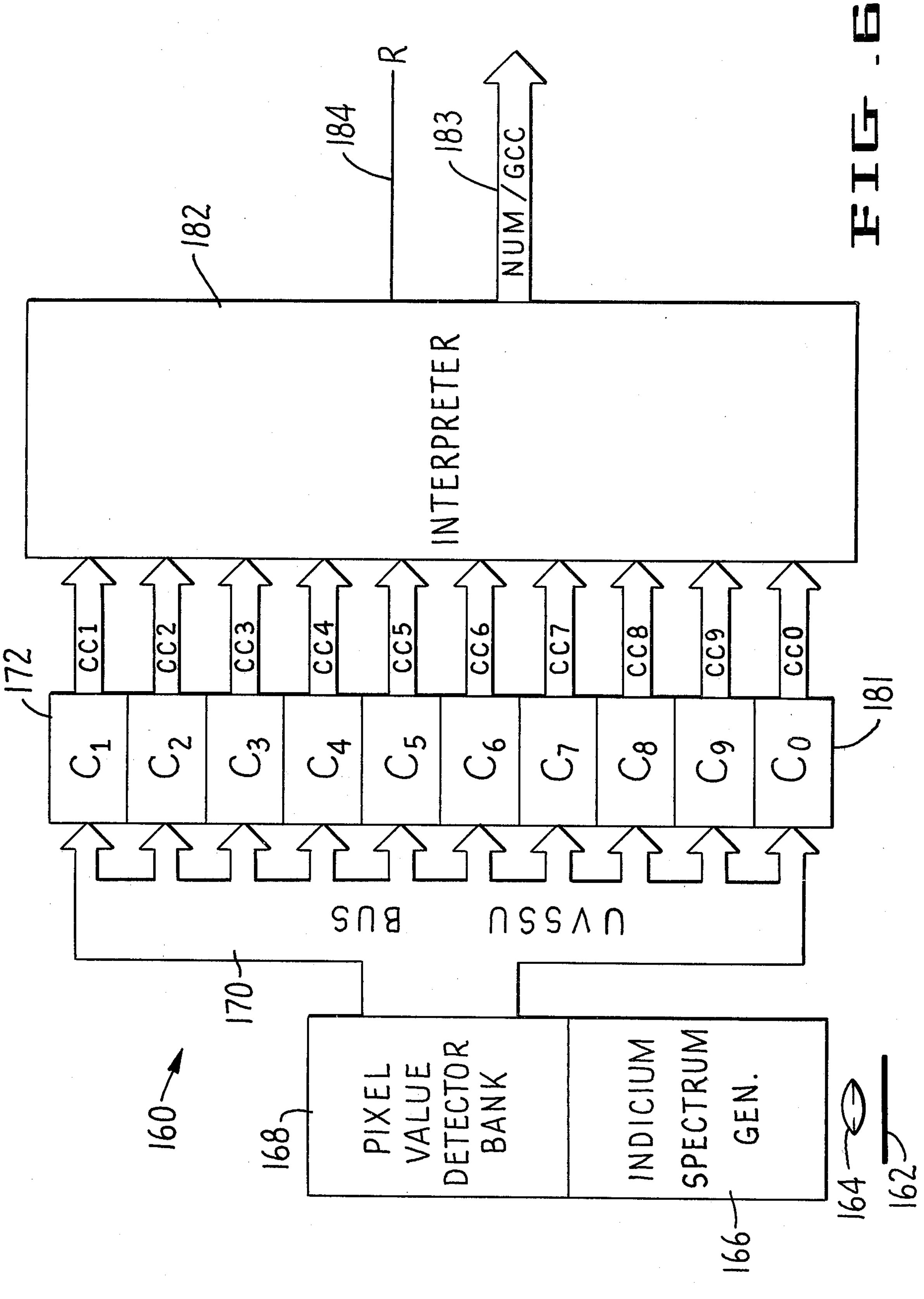
FIGS. 6 through 8 together constitute a schematic diagram of a handwritten numeral reader embodying my invention.

Since in handwritten numeral classifier 160 of FIG. 6 it is only desired to determine the signification of each indicium presented to the classifier, only one bank of pixel value detectors will be employed, and those detectors will be located at the pixel locations of the indicium spectrum generator display means which are characterized by the highest signification variance as determined from the corresponding mean signification variance matrix MSVM.

As will be evident to those having ordinary skill in the art, said pixel value detectors may, e.g., be suitable phototransistors, each juxtaposed to one of said highest signification variance pixels of the indicium spectrum generator display means, and provided with optical means to direct the light from said one pixel, and only said one pixel, to its light-sensitive area.

In other devices embodying may invention, such as signature verification devices, the origination of the signatures to be classified may be of equal or predominant interest, and in such devices the placement of the pixel value detectors and the number of pixel value detectors may also depend upon or may depend solely upon the "highest origination variance pixel locations". These pixel locations will, of course, be determined from the corresponding mean origination variance matrix (MOVM) in the same way in which the "highest signification variance pixel locations" are determined from the mean signification variance matrix (MSVM), i.e., by locating the pixels of the mean origination variance matrix having the greatest gray level values or intensity values, and taking those locations as the locations of the "highest origination variance pixels".

Thus, it will be understood that some devices embodying my invention may have two sets or constellations of pixel value detectors, the locations of the pixel value detectors of the "origination detector constellation" being determined in accordance with the mean origination variance matrix, and the locations of the pixel value detectors of the "signification detector constellation" being determined in accordance with the mean signification variance matrix.

In one such preferred handwritten signature verification device embodying my invention there will be no origination value sets or signification value sets stored in the device itself. Rather, the document bearing the signature to be classified, e.g., check 250 in FIG. 9, will bear an imprint 252 representing the indicium spectrum of the depositor's signature card signature made with the same kind of indicium spectrum generator which is incorporated into the signature verification device.

In this preferred embodiment, when the signature on the check is being verified, that signature (254) will be presented to the indicium spectrum generator in the verification device.

Thus, corresponding signal sets will be produced by a first origination detector constellation associated with the indicium spectrum generator and by a first signification detector constellation associated with the indicium spectrum generator, and these two sets of output signals will be presented to associated correlators, viz., the "origination signal correlator" and the "signification signal correlator", which operate in accordance with the one-dimensional correlation formula of FIG. 11.

Imprint 252 will be imaged from check 250 onto a second signification detector constellation and a second origination detector constellation, both juxtaposed to the image of imprint 252 as said first constellations are juxtaposed to the spectra displayed by the indicium spectrum generator.

The output signal set of the second origination detector constellation will be applied to the abovedescribed origination signal correlator, and the output signal set of the second signification detector constellation will be applied to the corresponding signification signal correlator.

Each signal correlator provides one correlation signal, and each of these correlation signals is matched with a predetermined threshold signal in an associated over-threshold-signal detecting device.

The signature verification device of this preferred embodiment is further provided with gating means responsive to the output signals of the two over-threshold-signal detecting devices, which gating means provides an output signal verifying signature 254 on check 250 if and only if both correlation signals rise above their corresponding predetermined thresholds.

In accordance with another preferred handwritten signature verifier embodiment of my invention, the imprint 252 on check 250 may be replaced with a multi-digit decimal number, e.g., in MICR characters, which multi-digit number is called the "origination index", and which consists of numerical representations of the gray level values or intensity values which in the previous embodiment would be represented by the output signals of the second origination detector constellation.

A further preferred embodiment may employ an additional index number imprinted in MICR characters on check 250, viz., a "signification index", which consists of numerical representations of the gray level values or intensity values which in the previous embodiment would be represented by the output signals of the second signification detector constellation.

The provision of apparatus for reading the origination index, or the origination index and the signification index, from such a check, and supplying the resulting signals to the correlator or correlators for use in verifying the signature on the check is within the scope of one having ordinary skill in the art when informed by the present disclosure.

In other particularly preferred embodiments of my invention the unclassified (detected) pixel constellation is determined in accordance with the overall variance matrix (OVM), rather than the mean origination variance matrix (MOVM) or the mean signification variance matrix (MSVM). (The detected pixel constellation is represented by the same set of pixel location codes as the pixel detector constellation.)

Thus, in a signature verification device 300 (FIG. 12) according to one particularly preferred embodiment of my invention the placement of the pixel value detectors of the first pixel value detector bank 306 will be determined in accordance with the pixel intensities of the overall variance matrix (OVM), in the following manner.

First, the overall variance matrix of the selected signature sample will be inspected (by human operation or by automatic operation of an image processing system) to determine the locations (x/y) of its highest gray level value or intensity level value pixels, these pixels being called the "highest overall variance pixels", and their locations being called the "highest overall variance pixel locations".

The number of highest overall variance pixels or pixel locations thus selected may be about thirty, although it will be understood that in some applications of said one particularly preferred embodiment of my invention other numbers of highest overall variance pixels and pixel locations may be selected by successive statistical trials, or computer modelings, in which the actual number of highest overall variance pixel locations to be used is determined in accordance with corresponding statistical confidence limits, determined in the well-known manner.

As will now be evident to those having ordinary skill in the optical data processing art, informed by the present disclosure, the first pixel value detectors of signature verifier 300 of said one particularly preferred embodiment of my invention will be juxtaposed in pixel intensity value detecting relation to the highest overall variance pixel locations of the display means of the indicium spectrum generator thereof, i.e., to the pixels or pixel locations of the indicium spectrum generator display means corresponding to or having the same pixel location codes (x/y) as the highest overall variance pixels selected in accordance with the pixel intensities of the overall variance matrix (OVM) in the manner described above. Thus, each of the limited number, say thirty, of pixel detectors in the first (unclassified) pixel detector bank 306 of the signature verifier of said one particularly preferred embodiment of my invention will be so disposed as to detect the gray level value or intensity value of a corresponding one of the highest overall variance pixels of the spectra of the samples of the signatures to be classified thereby.

Each pixel value detector may, e.g., comprise a suitable phototransistor and optical means for directing the light from the corresponding display means pixel location thereupon.

In the signature verifier 300 of said one particularly preferred embodiment of my invention there will be no data peculiar to any particular signatures stored in the device itself. Rather, the document bearing the signature to be classified, e.g., check 250 in FIG. 9, will bear an imprint 252 representing the indicium spectrum of a specimen of the user's (depositor's) signature made with the same kind of indicium spectrum generator which is incorporated into the signature verification device of this one particularly preferred embodiment.

In this one particularly preferred embodiment, when, e.g., the signature on check 250 is being verified, that signature (254) will be presented to the indicium spectrum generator of this embodiment.

The output signals produced on the output leads of the associated pixel value detectors will be supplied to the correlator of this embodiment. (The locations of these first bank pixel value detectors, taken as a group, will herein sometimes be called the "overall variance detector constellation".)

At the same time, imprint 252 will be imaged from check 250 onto a second bank of pixel value detectors which are juxtaposed to the image of imprint 252 in the same manner in which the first bank pixel value detectors are juxtaposed to the pixels on the display screen of the indicium spectrum generator.

The output signal set of said second bank of pixel value detectors is also applied to the correlator of this embodiment.

The correlator provides one correlation signal in accordance with the one-dimensional correlation formula of FIG. 11, and this correlation signal is matched with a predetermined threshold signal in an associated over-threshold-signal detecting device or threshold comparator which provides an output signal verifying signature 254 on check 250 if and only if the correlation signal rises above a corresponding predetermined threshold.

In a first variant of this one particularly preferred embodiment of my invention, the imprint 252 on check 250 may be replaced by a multi-digit decimal number, e.g., in MICR (magnetic ink character recognitions) characters, which multi-digit number is called the "overall index", and which consists of numerical representations of the gray level values or intensity values of the pixels of imprint 252 which are detected by pixel value detectors of the second bank in said one particularly preferred embodiment of my invention.

The provision of apparatus for reading the overall indices from checks used in connection with said first variant of said one particularly preferred embodiment of my invention, and supplying the resulting signals to the correlator of said first variant for use in verifying the signatures on such checks, is within the scope of one having ordinary skill in the optical data processing art, when informed by the present disclosure.

Returning to the discussion of the handwritten numeral reader (160, FIG. 6) embodying my invention, the method of my invention for determining the signification value sets corresponding to the numerals 1, 2, 3, 4, 5, 6, 7, 8, 9, and 0 (i.e., the significations 1 through 10 of FIG. 2C) will now be discussed.

As taught hereinabove, the pattern classification devices of my present invention correlate one or more stored class value sets or classification value sets with each unclassified value set (corresponding to a pattern to be classified) which is produced by a pattern spectrum generator and an associated pixel value detector bank or constellation.

In the automatic handwritten numeral classifier or reader of FIG. 6 (160) the stored class value sets are determined in accordance with the mean signification variance matrix (MSVM) of the corresponding population of signatures gathered for the purpose of designing that embodiment of my invention, and thus may be called "signification value sets".

Automatic handwritten numeral reader 160 comprises ten memory devices or areas, each corresponding to one of the numerals to be read. The memory device of area corresponding to the numeral 1 will be designated "M1", the memory device or area corresponding to the numeral 2 will be designated "M2", etc.

In M1 will be stored a representation of the set of signification values called signification value set 1, or SVS"1"; in M2 will be stored a representation of the set of signification values called signification value set 2, or SVS"2"; etc.

In general, the number of values in each class value set of a device of my invention will be equal to the number of values in the unclassified value set of the same device, and thus will be equal to the number of pixel detectors in the unclassified pixel detector bank or constellation of that device.

Thus, if the number of pixels in pixel value detector bank 168 of numeral reader 160 (FIG. 6) is thirty, then the unclassified value set thereof will consist of thirty values, and each class (signification) value set will consist of thirty values.

It is convenient to assign to each signification value of any given signification value set an identification numeral selected in accordance with the order in which the corresponding unclassified pixel locations of the spectrum generator (166) display screen are swept by the associated writing beam.

Thus, it will be seen that signification value set SVS"1" consists of thirty values, which may be designated as SV1/"1", SV2/"1", SV3/"1", . . . , SV29/"1", and SV30/"1"; signification value set SVS"2" consists of thirty values, which may be designated as SV1/"2", SV2/"2", SV3/"2", . . . , SV29/"2", and SV30/"2"; etc.

Further, in reader 160, each signification value is stored in binary-coded decimal form, and thus may, e.g., be represented in its corresponding memory by five memory bits (1, 2, 4, 8, 16). It follows that, for example, SV22/"5" may be stored in memory M5 as five memory bits, designated respectively as SV22(1)/"5", SV22(2)/"5", SV22(4)/"5", SV22(8)/"5", and SV22(16)/"5".

In general, then, any one signification value set in reader 160 will be designated by SVS"x"; any one signification value will be designated by SVy/"x", and any one signification value memory bit will be designated by SVy(z)/"x".

Similarly, each unclassified (pixel) value of any unclassified value set (UVS) has assigned to it an identifying numeral selected in accordance with the order in which the corresponding spectrum generator display screen pixels are swept by the writing beam.

Thus UVS consists of thirty values designated respectively as UV1 through UV30.

Further, since the UVS is represented on bus 170 in binary-coded decimal form, each single value of the UVS is represented by five signals (on five conductors). Thus, UV1 is represented by UV1(1), UV1(2), UV1(4), UV1(8), and UV1(16). Similarly, UV2 is represented by UV2(1), UV2(2), UV2(4), UV2(8), and UV2(16).

In general, then, any unclassified value set value will be represented by UVx, and any signal on bus 170 will be represented by UVx(y).

For convenience in describing reader 160, each signification value of a particular signification value set may alternatively be identified by the coordinates of its corresponding unclassified pixel location. Thus, e.g., one particular signification value might be described as SV"5"10/16:11, meaning that in the signification value set corresponding to the numeral 5, i.e., SVS"5", the signification value corresponding to pixel location 10/16 of the corresponding unclassified pixel detector constellation is the 11th gray level value of a predetermined set of gray level values, which might, for example, consist of 16 discrete values.

Referring to FIG. 2C, and assuming that it is desired to determine signification value SV"1"16/19, the gray level or intensity value of the 16/19 pixel of each indicium spectrum 1A through 1L of row 1 will first be determined. The mean of these 12 gray level or intensity values will then be determined, and that mean value will be signification value SV"1"16/19.

(In the event that the signification value memories M1 through M10 are capable of storing only the discrete gray level or intensity values of said predetermined set, then the mean of said twelve gray level or intensity values taken in determining SV"1"16/19 will be rounded to the nearest value of said set of predetermined values. It may, for similar reasons, be necessary to thus round off other mean gray level or intensity values determined in carrying out my invention, and such is within the scope of my invention.)

Similarly, the signification value SV"5"25/42 may be determined by taking the mean value of the gray level or intensity values of the 25/42 pixels of indicium spectra 5A through 5L of FIG. 2C, and rounding if necessary.

In general, then, the signification value corresponding to pixel x/y of the signification value set corresponding to a particular signification S is equal to the mean of the gray level or intensity values of the x/y pixels of the sample indicium spectra derived from specimens of indicia having the signification S, rounded to the nearest discrete value when it is desired or necessary that the signification value be expressed in terms of a set of discrete values.

It is to be noted at this point, although not necessary to be discussion of the handwritten numeral reader embodying my invention, that the origination values making up an origination value set, as defined hereinabove, may be determined in substantially the same way in which signification values are determined, except for the fact that the pixel gray level or intensity values which are averaged are determined from a corresponding one of the vertical columns of FIG. 2C.

Supposing, then, that in a device embodying my invention the origination detector constellation includes pixel location 12/19, and that it is desired to determine the corresponding origination value to be stored in origination memory ME, corresponding to origination E. The gray level or intensity value of the 12/19 pixel of each sample indicium spectrum derived from origination E will first be determined, the mean of these gray level or intensity values will then be taken, and that mean value, rounded to the nearest one of a predetermined plurality of discrete values, if necessary, will be the desired origination value.

Referring now to FIG. 6, there is shown a schematic diagram of a handwritten numeral reader 160 embodying my invention.

As seen in FIG. 6, a portion 162 of a document is so juxtaposed to the optical input means 164 of an indicium spectrum generator 166 that an unknown indicium U printed on document 162 is operatively presented to indicium spectrum generator 166, and thus a partial digital log Fourier spectrum of unknown indicium U is present on the output means (e.g., display screen) of indicium spectrum generator 166. (It will be understood by those having ordinary skill in the art, informed by the present disclosure, that in some embodiments of my invention the indicium spectrum generator generates more pixels of the indicium spectrum than the pixels of the signification constellation and the origination constellation, while in other embodiments of my invention the indicium spectrum generator generates only the pixels of one or both of the origination constellation and the signification constellation.)

Referring again to FIG. 6, it will be seen that handwritten numeral reader 160 further comprises a pixel value detector bank or constellation 168 which coacts with indicium spectrum generator 166 to produce an unclassified value signal set corresponding to unknown indicium U, i.e., UVSSU, on the UVSSU bus 170.

If indicium spectrum generator 166 is of the type shown in FIGS. 3 through 5 hereof, and described in connection therewith, pixel value detector bank or constellation 168 may comprise a plurality of photosensors corrresponding in number and location to the pixels of the unclassified pixel constellation, optical means for exposing each such photosensor to one and only one of the pixels of the unclassified pixel constellation as displayed on the display screen of the indicium spectrum generator, and suitable amplifier means associated with such photosensor to stabilize the output thereof against loading error. Such an amplifier may be an integrated circuit operational amplifier, provided with a suitable emitter-follower output stage such as an FET emitter-follower stage if necessary. Each such amplifier will be connected to one conductor of UVSSU bus 170, and thus it will be assumed that so long as the unknown indicium U on document 162 is operatively presented to indicium spectrum generator 166 a continuous analog signal representative of the intensity value of the corresponding unclassified pixel constellation pixel will exist on each conductor of UVSSU bus 170.

(It is assumed, of course, that the individual pixel value detectors of bank 168 are operatively juxtaposed to corresponding pixels of the display screen of generator 166, the location of which pixels has been determined by the unclassified pixel constellation determining method of my invention, using an indicium spectrum generator substantially identical to, or at least functionally identical to, generator 166.)

Referring again to FIG. 6, it will be seen that reader 160 further comprises ten correlators C1, C2 . . . C9, C0, which will sometimes be identified by the respective reference numerals 172 through 181. (Correlator 172 is described hereinafter in connection with FIG. 7, and the other correlators are substantially identical thereto, with the exception of the contents of their respective memories M1 (193-1), M2 (193-2), etc.)

It suffices here to point out that each correlator 172 through 181 contains a memory in which is stored a representation of the signification value set corresponding to the numeral with which that correlator is identified, derived from the corresponding part of said sample of handwritten numerals by means of the appropriate method of my invention. Thus, the memory of correlator 172 contains SVS"1", as defined above, the memory of correlator 173 contains SVS"2", . . . and the memory of correlator 181 contains SVS"10".

In accordance with my invention, each correlator serves to correlate the signals of UVSSU with the corresponding signification values stored in its memory, in accordance with the one-dimensional correlation formula of FIG. 11.

Referring again to FIG. 6, it will be seen that each correlator is provided with an output bus or set of conductors. For example, correlator 172, the C1 correlator, is provided with output bus or conductor set CC1, correlator 173 is provided with output bus or conductor set CC2, etc.

By the operation of the correlators in accordance with the formula of FIG. 11 as described above, each bus or conductor set CC1, CC2, . . . CC9, CC0 is provided with signals, e.g., in binary-coded decimal form, which represent the numerical value of the corresponding one-dimensional correlation coefficient. Thus, bus CC1 is provided with binary-coded decimal signals representing the numerical value of the one-dimensional correlation between the unclassified numeral signification value set (UVS), represented by UVSSU, and SVS"1", represented by the signification value signal set SVSS"1" on bus 195-1, which corresponds to the data stored in the memory (M1) of correlator $C_1$; bus CC2 is provided with binary-coded decimal signals representing the numerical value of the one-dimensional correlation between UVSSU and SVSS"2", i.e., between UVS and SVS"2"; etc.

Referring again to FIG. 6, it will be seen that the correlation coefficient representing signals on busses CC1 through CC0 are applied to input terminals of an interpreter 182, which has an output bus 183 and an output lead 184.

As explained below, interpreter 182 serves to compare the correlation coefficient values supplied on busses CC1 through CC0 to determine which value is greatest, and to present on bus 183 a binary-coded decimal representation of the numeral corresponding to that one of the busses CC1 through CC0 on which the greatest correlation coefficient value appears. Interpreter 182 also serves to produce a "reject" signal on line 184 if no received correlation coefficient value is sufficiently great, or if the two or more of largest received correlation coefficient values are so close to each other as to indicate a probable reading error.

Figure 7:
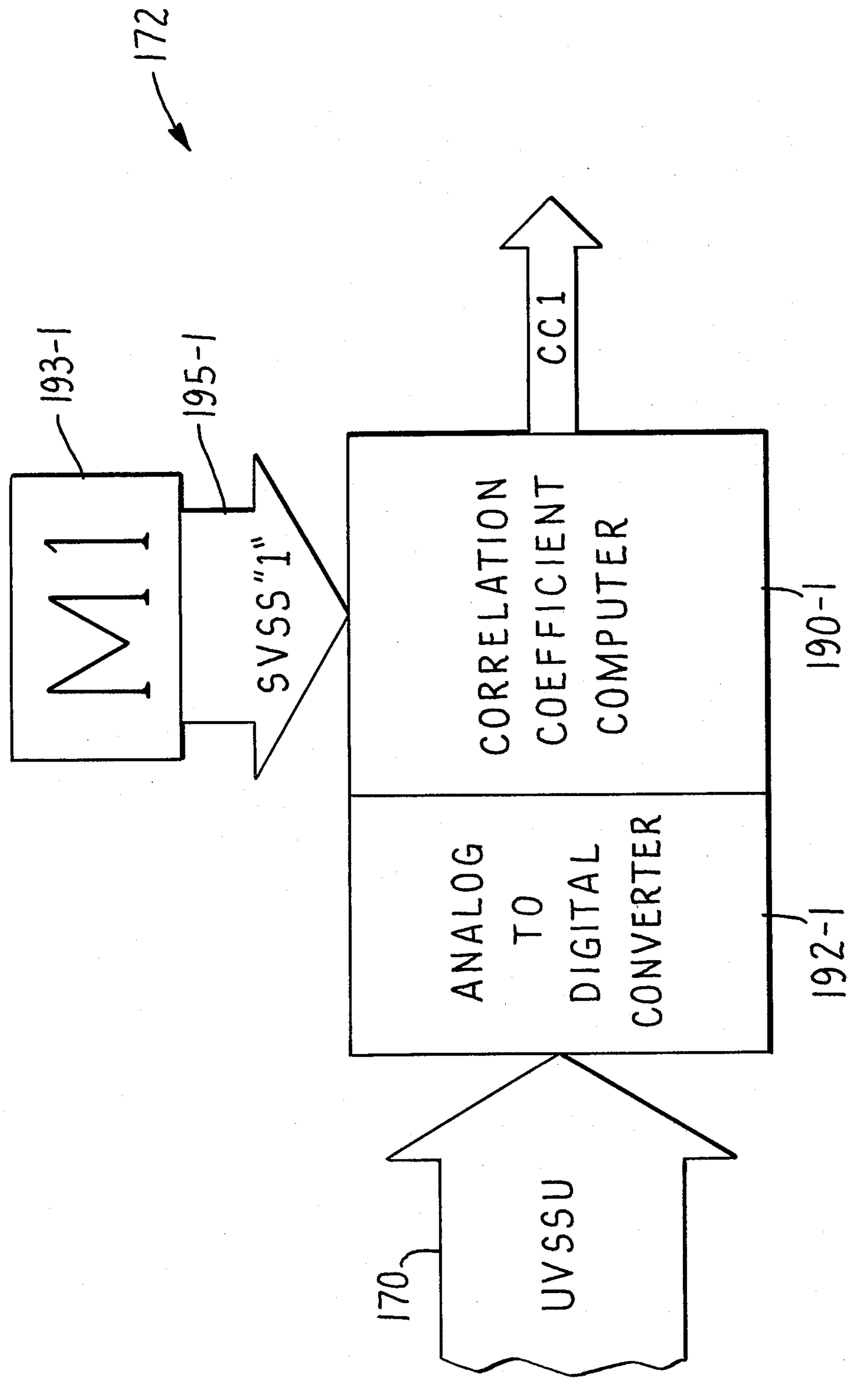

Referring now to FIG. 7, there is shown a schematic diagram of correlator 172 (FIG. 6).

Correlator 172 comprises a correlation coefficient computer 190-1 which is a dedicated microcomputer, e.g. Intel 8080, permanently programmed to compute the correlation coefficient CC1, and thus to provide the correlation coefficient signal set which appears on bus CC1, in accordance with the one-dimensional correlation co-efficient formula of FIG. 11.

In programming computer 190-1, the variable $U_i$ in FIG. 11 is taken, sequentially, to be the several unclassified (pixel) value set values UV1, UV2, . . . UV29, UV30, present at a particular time on UVSSU bus 170, and the variable $S_i$ is taken to be the corresponding class (signification) value set values, SV1/"1", SV2/"1", . . . , SV29/"1", and SV30/"1". Similarly, in programming computer 190-2 the variable $U_i$ of FIG. 11 is taken to be UV1, UV2, etc.; and the variable $S_i$ is taken to be SV1/"2", SV2/"2", SV3/"2", etc. These values are further assumed in these programs to be paired in accordance with their plain, i.e., unquoted, arabic numeral components; e.g., UV1 with SV1/"1", UV2 with SV2/"1", UV1 with SV1/"2", UV2 with SV2/"2", etc.

Such microcomputers, e.g., the Intel 8080, are well-known to those having ordinary skill in the art, and the programming of the same to carry out simple computations, such as the computation represented by the formula of FIG. 11, is well within the scope of those having ordinary skill in the art.

As pointed out hereinabove, the unclassified value set signals UVSSU on bus 170 take the form of analog electrical signals in this embodiment of my invention. For this reason, an analog-to-digital converter 192-1 is provided to convert the analog signals on bus 170, seriatim, into corresponding digital signal sets of the kind which microcomputer 190-1 is adapted to receive.

Converter 192-1, and the corresponding converters 192-2 through 192-0, each comprise suitable gating means adapted to be operated by signals from the associated correlation coefficient computer 190-1, 190-2, etc., to control the feeding to the associated computer 190-1, 190-2, etc., of the respective sets of unclassified value set values UV1, UV2, UV3, etc., seriatim, in the well known manner. Each such gating means is arranged to selectively supply to its associated analog-to-digital converter the successive binary-coded decimal analog signal sets UV1, UV2, . . . UV29, UV30, from the conductors of bus 170, under the control of its associated correlation coefficient computer.

Such analog-to-digital converters and gating systems are well-known to those having ordinary skill in the art, particularly in the form of integrated circuit "chips". The selection and interconnection of such a combination of integrated circuit "chips" is well within the scope of those having ordinary skill in the art. A dedicated microcomputer, e.g., Intel 8080, may be adapted to this purpose by one having ordinary skill in the art without the exercise of invention.

Correlator 172 also comprises a suitable "read only" memory 193-1, also called memory M1. Memory 193-1 may be of any well-known type suitable for cooperation with microcomputer 190-1, such as a solid state PROM (programmable read only memory) or group of the same.

Memory 193-1 is interconnected with micrcomputer 190-1 by means of SVSS"1" bus 195-1, which, in the well-known manner, includes not only read-out conductors but also reading signal conductors whereby signals designating particular parts of the memory contents to be read at a given time may be received from microcomputer 190-1.

As pointed out above, the contents of memory 193-1 represent the signification value set SVS"1" derived from the handwritten numerals 1 of the abovesaid sample of handwritten numerals by means of the appropriate method of my invention. SV1/"1", SV2/"1", SV3/"1", etc. are read from memory 193-1 seriatim, under control of said signals on said reading signal conductors.

Taking the first unclassified value corresponding to indicium U to be represented by UV1, and the corresponding class (signification) value from memory 193-1 to be represented by SV1/"1", etc., it will be seen that for each unknown indicium U microcomputer 190-1, in accordance with the formula of FIG. 11, computes the product of UV1 and SV1/"1", the product of UV2 and SV2/"1", etc., and accumulates these products in a memory location L1 (either internal or external); squares all of the UV values, i.e., UV1, UV2, UV3, etc., and cumulates these squared values in a memory location L2; squares all of the SVS"1" values, i.e., SV1/"1", SV2/"1", SV3/"1", etc., and cumulates these squared values in a memory location L3; computes the product of the summed, squared UV values (from L2) and the summed, squared SVS"1"values (from L3); computes the square root of this product of the summed, squared UV and SVS"1" values; divides the accumulated (UVx) (SVy/"1") products in L1 by this square root; and presents the (value of) the quotient on bus CC1, e.g., in binary-coded decimal form, this signal set being designated CC1SS.

The other correlators $C_2$ through $C_0$ are all substantially identical to correlator $C_1$, except for the contents of their respective memories, $M_2$ through $M_0$, and operate in the same way to provide the correlation coefficient signal sets CC2SS through CC0SS on the corresponding busses CC2 through CC0. Like parts in different correlators are indicated by the same reference numeral, followed by a digit indicating the particular correlator.

As will be apparent to those having ordinary skill in the art, the contents of memory $M_2$ represent the signification value set SVS"2", derived from the handwritten numerals 2 of the abovesaid sample of handwritten numerals, the contents of memory $M_3$ represent the signification value set SVS"3", derived from the handwritten numerals 3 of the abovesaid sample of handwritten numerals, etc.

Figure 8:
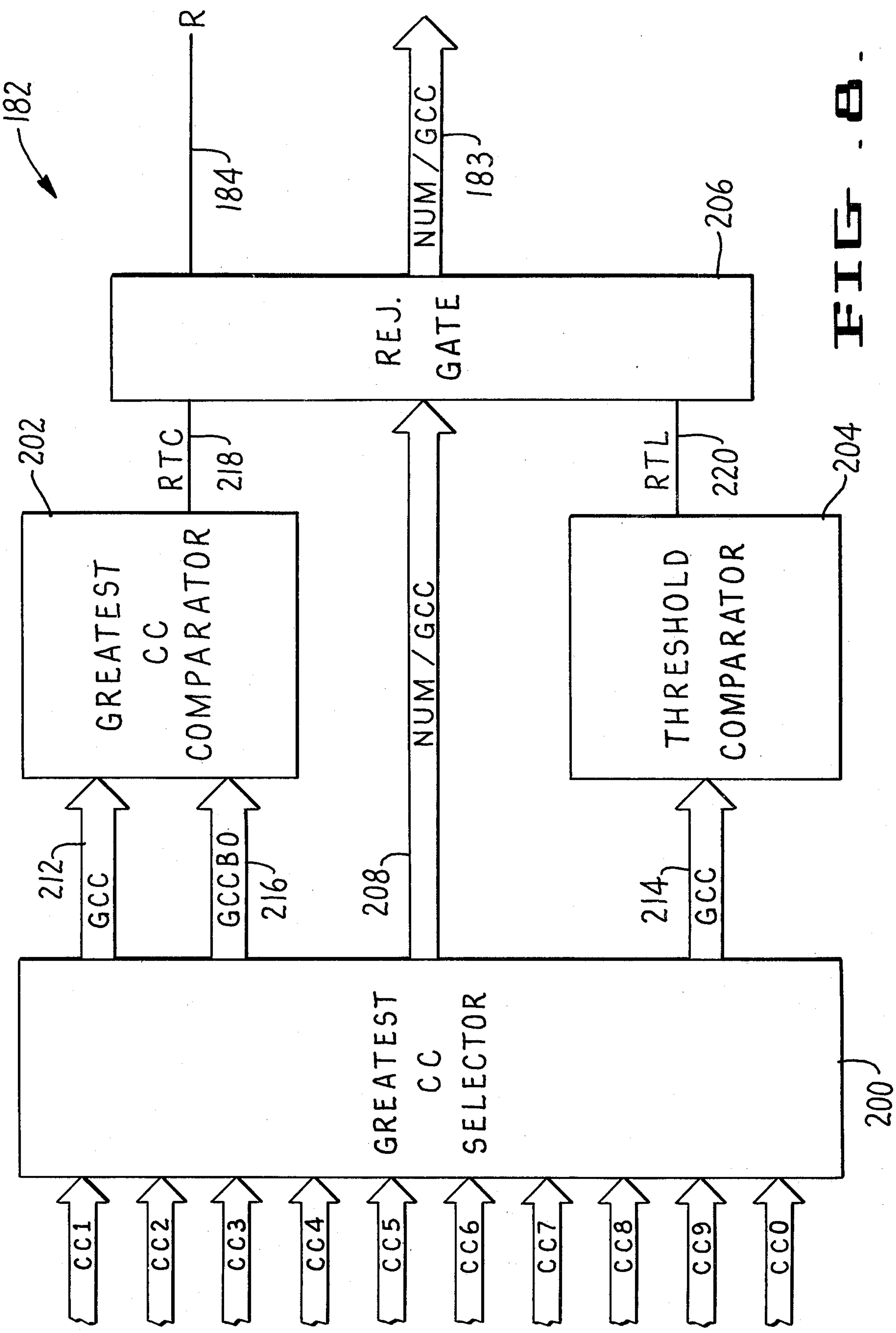

Referring now to FIG. 8, there is shown a schematic diagram of interpreter 182 (FIG. 6).

Interpreter 182 comprises four major elements, viz., the greatest correlation coefficient selector 200, the greatest correlation coefficient comparator 202, the threshold comparator 204, and the rejection gate 206, each of which may be a microcomputer of well-known type, e.g., an Intel 8080, programmed by one having ordinary skill in the art to carry out the functions described hereinbelow.

As seen in FIG. 8, greatest correlation coefficient selector 200 receives the ten correlation coefficient signal sets, CC1SS . . . CC0SS, computed by correlators 172 through 181, via busses CC1 . . . CC0.

Greatest correlation coefficient selector 200 is programmed to array each successive set of correlation coefficient values received via busses CC1 through CC0 in descending numerical order in a corresponding set of ten storage locations. The programming of microcomputers to carry out such an ordering function is well within the scope of those having ordinary skill in the art.

Further, in accordance with its permanent programming, this dedicated mirocomputer retains each ordered set of correlation coefficient values in said corresponding set of ten storage locations until a command signal is received from the device which positions documents such as document 162 in juxtaposition to indicium spectrum generator 166 indicating that a new unknown indicium has been juxtaposed to indicium spectrum generator 166 for reading. Devices for the provision of such command or registration signals are well-known in the art, and will not be described here.

Greatest correlation coefficient selector 200 also includes a separate set of ten "read only" memory locations, in each one of which is stored a digital representation of one of the numerals 1 through 0.

Greatest correlation coefficient selector 200 is also programmed to respond to the correlation coefficient value stored in the highest order, i.e., greatest value, one of said ten correlation coefficient storage locations by transferring from said "read only" memory to an output register the digital representation of the corresponding numeral. Thus, if the correlation coefficient of greatest numerical value among a particular set of correlation coefficients on busses CC1 through CC0 is manifested on bus CC7, and thus corresponds to the numeral 7, the dedicated programming of correlation coefficient selector 200 will cause the transfer of the digital representation of the numeral 7 from its said "read only" memory into its output register.

Since, in this embodiment of my invention, said output register is interconnected with the several conductors of bus NUM/GCC 208, e.g., through suitable amplifying and buffering means, a digital representation of the numeral corresponding to the greatest correlation coefficient stored in any one of said ten storage locations will appear on bus 208 when that same digital representation is inserted into said output register.

Greatest correlation coefficient selector 200 is also provided with two GCC output busses 212, 214 whose signals are derived from said highest order (greatest correlation coefficient value) storage location. Thus, GCC busses 212, 214 both carry digital signals representing the numerical value of the greatest or largest correlation coefficient of the set which was most recently received on busses CC1 through CC0.

Similarly, greatest correlation coefficient selector 200 is provided with a GCCBO, i.e., greatest-correlation-coefficient-but-one output bus 216 on which there is electrically represented in digital form the numerical value of the second largest correlation coefficient of the set which was most recently received on busses CC1 through CC0.

Referring again to FIG. 8, it will be seen that the greatest correlation coefficient comparator 202 receives as its inputs the sets of signals on busses 212 and 216, i.e., the GCC or "greatest correlation coefficient" signal set, and the GCCBO or "greatest correlation coefficient but one" signal set.

Greatest correlation coefficient comparator 202 may be a dedicated microcomputer, e.g., an Intel 8080, programmed to operate as a simple Boolean comparison gating system to determine whether the numerical value represented by the signals on busses 212 and 216 do or do not differ by a predetermined amount (the value of which amount is stored in a "read only? memory location in greatest correlation coefficient comparator 202).

When the GCC and GCCBO signals do not differ by at least said predetermined amount, an H (higher level) signal is produced on the single output line 218 of greatest correlation coefficient comparator 202. This signal may be called the RTC (reject, too close) signal. Conversely, when the GCC and GCCBO signals differ by said predetermined amount or more an L (lower level), or not-RTC signal is produced on output line 218. The programming of a micro computer to carry out these functions is well within the scope of one having ordinary skill in the art.

Referring again to FIG. 8, it will be seen that threshold comparator 204 receives but one input signal set, the GCC signal set on bus 214. Threshold comparator 204 may be a dedicated micro computer, e.g., an Intel 8080, programmed to compare the numerical value of the GCC signal or signal set received on bus 214 with an internally stored predetermined threshold value, and to produce an H signal on output line 220 whenever the numerical value of the GCC signal is less than said predetermined threshold value. The signal on output line 220 may be called the RTL (reject, too low) signal. Conversely, when the numerical value of the GGC signal equals or exceeds said predetermined threshold value, an L signal is produced on output line 220. The programming of a microcomputer to carry out these functions is well within the scope of one having ordinary skill in the art. The magnitude of said threshold value may best be determined in accordance with the criticality of the use to which the reader is applied.

Referring again to FIG. 8, it will be seen that rejection gate 206 receives as its input signals said RTC and RTL signals, and the NUM/GCC (numeral corresponding to the greatest correlation coefficient value) signal set on bus 208.

Rejection gate 206, which, like greatest correlation coefficient comparator 202 and threshold comparator 204, may be a simple gating arrangement the provision of which is well within the scope of those having ordinary skill in the art, or a dedicated microcomputer, serves to prevent the appearance of the NUM/GCC signal set on output bus 183 when either the RTC signal or the RTL signal is present, or both are present, i.e., when an H signal appears on its input line 218 or an H signal appears on its input line 220, or both.

Thus, it will be seen that interpreter 182 serves to provide on its output bus 183 a signal representing the numeral most probably corresponding to the unknown indicium U presented to indicium spectrum generator 166 (FIG. 6), unless either (a) none of the correlation coefficients computed by the correlators $C_1$ through $C_0$ is large enough to indicate a high probability of correct identification of the unknown indicium, or (b) two or more of the thus-computed correlation coefficient values are too close to each other, and thus the probability of a unique identification of the unknown indicium is not sufficiently large.

Rejection gate 206 also serves to provide, on output line 184, an H signal whenever the RTC signal is present, the RTL signal is present, or both are present, i.e., whenever there is an H signal on line 218, on line 220, or both. This signal may be called the R(reject) signal, and may be used, e.g., when it it desired that the documents being read be sorted into a separate pile or marked if the handwritten numeral reader is "unable to read" any numeral thereon which it is intended to read. The programming of a dedicated microcomputer or the provision of suitable gating means to carry out these functions is within the scope of one having ordinary skill in the art.

Figure 12:
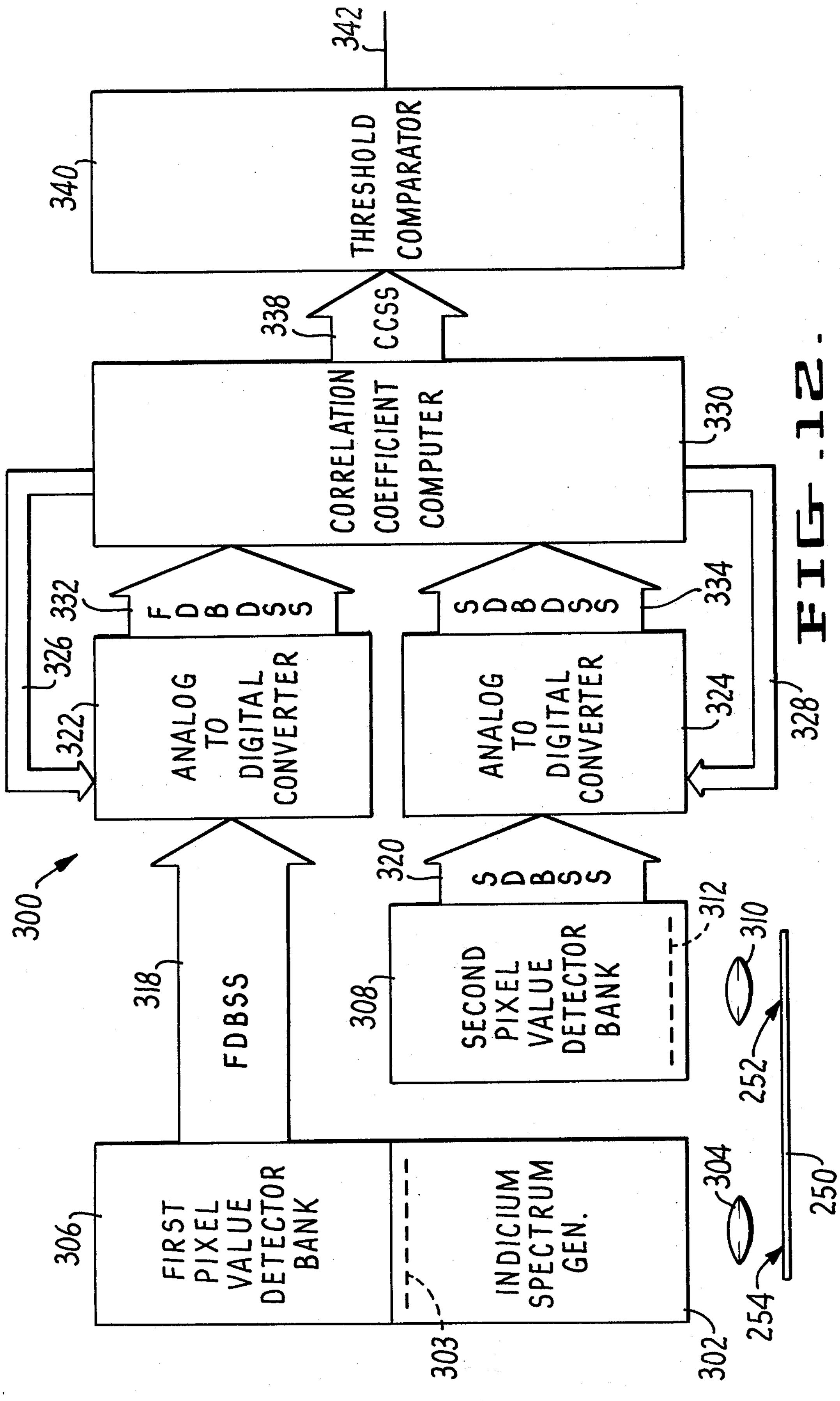
FIG. 12 is a schematic diagram of a handwritten signature verifier embodying my invention.

Referring now to FIG. 12, there is shown a schematic diagram of a signature verification device 300 constructed in accordance with said one particularly preferred embodiment of my invention.

As seen in FIG. 12, signature verifier 300 comprises an indicium spectrum generator 302, including optical input means 304, a first pixel value detector bank or pixel detector bank 306, sometimes also called an overall variance detector bank, and a second pixel value detector bank or pixel detector bank 308.

As also seen in FIG. 12, a check 250 (FIG. 9) is disposed adjacent the optical input means 304 of indicium spectrum generator 302 and the optical input means 310 of second pixel detector bank 308. (In the practice of my invention check 250 will be but one of a succession of checks which are successively presented to optical input means 304 and 310 by suitable paper-handling apparatus of well known type, just as a succession of documents 162 may be automatically presented to the optical input means 164 of FIG. 6 by paper-handling apparatus of well known type. Such paper-handling apparatus, however, is not a part of my invention, and thus is not shown or described in detail herein.)

As taught hereinabove, the individual pixel value detectors of first pixel value detector bank 306 are constellated in a constellation which is determined in accordance with the pixel intensities of the overall variance matrix (OVM) of a signature sample selected from a relevant population in the manner described above in connection with FIG. 2A. Thus, the pixel value detectors of bank 306 may be said to be constellated in accordance with the overall variance detector constellation of said one particularly preferred embodiment of my invention. This constellation may also be called the pixel detector constellation of signature verifier 300, since the pixel value detectors of second pixel value detector bank 308 will also be constellated in the same constellation.

As also taught hereinabove, the indicium spectrum generator which is used in providing the indicium spectrum matrix from which the pixel detector constellation is determined is preferably substantially identical to indicium spectrum generator 302.

The indicium spectrum generator (302) of FIG. 12 will be assumed to be an indicium spectrum generator of the type shown and described hereinabove in connection with FIGS. 3, 4, 5A, 5B, and 5C. Thus, it will be understood that indicium spectrum generator 302 is provided with a display screen 303 on which is displayed, as an intensity function, an "insular pixel" digital log Fourier signature spectrum corresponding to the signature presented to optical input means 304, which in the case shown in FIG. 12 is the signature 254 on check 250 of FIG. 9.

As taught hereinabove, each pixel value detector of pixel value detector bank 306 will be registered in light receiving and detecting relation with one and only one of the pixels displayed on display screen 303. Each such pixel on screen 303 may be termed a "detected pixel", in order to distinguish it from the much more numerous pixels on screen 303 which are not associated with one of the pixel value detectors of pixel value detector bank 306, i.e., the "undetected pixels".

This being so, it will be evident to those having ordinary skill in the optical data processing art, informed by the present disclosure, that the pixel location code designation of each pixel value detector of bank 306 will be the same as the pixel location code designation of the corresponding detected pixel on screen 303.

Thus, one having ordinary skill in the optical data processing art will be able to properly position the pixel value detectors of pixel value detector bank 306 with respect to the pixels displayed on screen 303 without undue experimentation and without the exercise of invention.

Further, since the Fourier transform is a position-invariant transform, the location of signature 254 with respect to the optical axis of optical input means 304 will not be critical, so long as signature 254 lies within the field of optical input means 304. (As will be obvious to those having ordinary skill in the optical data processing art, informed by the present disclosure, the pixel value detectors of pixel value detector bank 168 and the corresponding pixels displayed on the display screen of indicium spectrum generator 166, both of FIG. 6, may be registered in the same way, but with respect to the highest signification variance pixels of the display screen.)

Second pixel value detector bank 308 of FIG. 12 will be assumed to be substantially identical to first pixel value detector bank 306 of FIG. 12, with the exception that whereas each individual pixel detector of bank 306 is registered in light receiving and detecting relation with a corresponding pixel displayed on screen 303 of indicium spectrum generator 302, each individual pixel detector of pixel value detector bank 308 is registered in light receiving and detecting relation with a corresponding pixel area of the image screen 312 on which imprint 252 is imaged by optical input means 310 (FIG. 12).

As taught hereinabove, imprint 252 (FIG. 9) is a pictorial representation of the indicium spectrum of the signature card signature of the depositor on whose account (No. 12345678) check 250 is drawn, which indicium spectrum or signature spectrum was made with an indicium spectrum generator substantially identical to the indicium spectrum generator incorporated in signature verifier 300, viz., indicium spectrum generator 302, 304.

Figure 9:
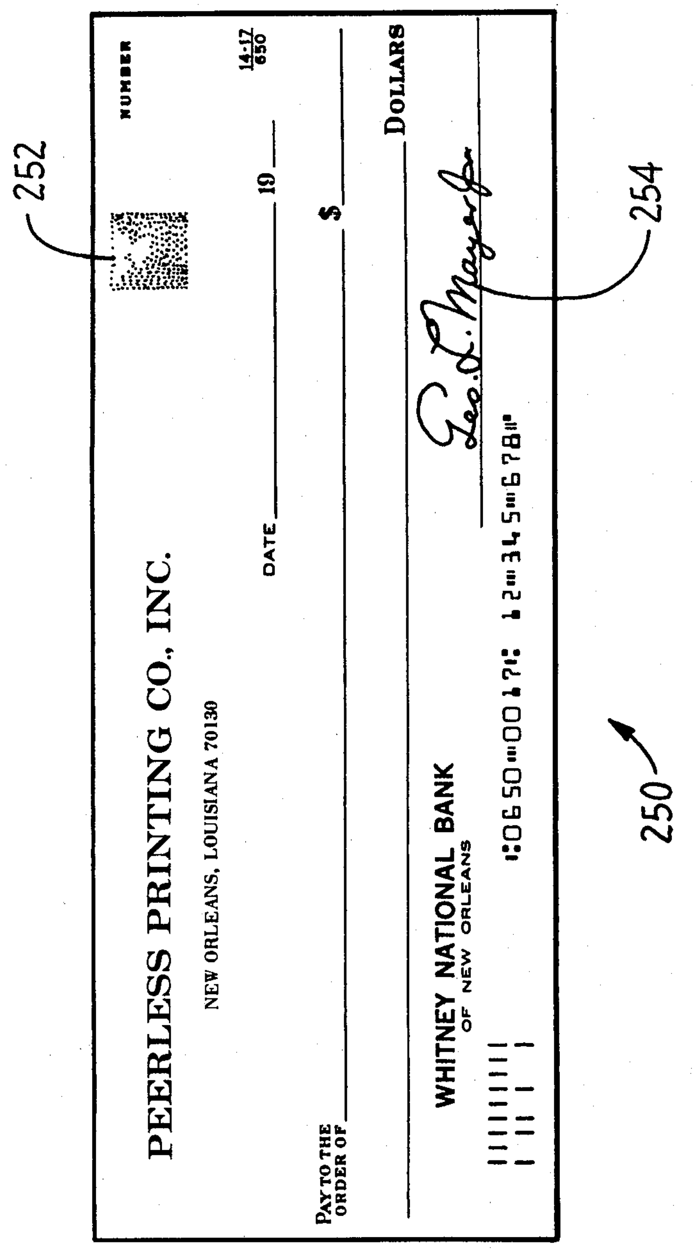
FIG. 9 shows a bank check of a kind adapted for use in connection with an embodiment of my invention.

As seen in FIG. 9, imprint 252 occupies an area of check 250 which is small when compared with the area occupied by signature 254. Thus, it will be understood that optical input means 310 will be capable of magnifying imprint 252 so that the representation of imprint 252 imaged upon image screen 312 of second pixel detector constellation 308 will be substantially identical in size to the signature spectrum displayed on the display screen 303 of indicium spectrum generator 302.

This is not to say that the signature spectrum displayed on image screen 312 will necessarily be identical to the signature spectrum displayed on display screen 303. To the contrary, it is to be expected that these two signature spectrum representations will be different in some respects even when, as is the case in FIG. 9, the imprint (252) on the check (250) represents the spectrum of the signature card signature of the same person whose later-written signature (254) appears on the signature line of the check.

Clearly, then, the signature spectra represented respectively on screens 303 and 312 will be much more different from each other when the signature on the check presented to signature verifier 300 was not written by the depositor whose signature card signature was used in producing the imprint on the check.

However, while these two representations of signature spectra (on screens 303 and 312, respectively) will seldom if ever be identical, it is essential to the proper operation of signature verifier 300 that the corresponding pixel detectors of detector banks 306 and 308 be registered with the corresponding pixels of these two signature spectrum representations. As an example, if one of the pixel detectors of bank 306 is registered with a pixel displayed on display screen 303 whose location code is 14/56, then the corresponding pixel detector of bank 308 must be registered with the pixel displayed on screen 312 whose location code is 14/56.

This follows from the fact that, as pointed out hereinabove, the pixel value detectors of bank 308 are constellated in the same constellation as the pixel value detectors of bank 306. Since the pixel value detectors of these two banks are constellated in the same constellation, the corresponding pixel detectors of the two banks have the same pixel location codes.

The common constellation of the pixel value detectors of banks 306 and 308 is, however, determined by my above-disclosed method of highest overall variance pixel determination, which gives the pixel location codes of the respective detected (unclassified) pixels, to which the unclassified pixel value detector locations correspond.

Put briefly, each pixel value detector of bank 306 is registered with a detected pixel on screen 303 the location code of which is determined from the overall variance matrix of a selected signature sample in accordance with the method of my invention taught hereinabove. Each pixel value detector of bank 306 is considered to have the same location code as the detected pixel with which it is registered. Each pixel value detector of bank 308 is registered with a detected pixel on screen 312 the location code of which corresponds to, i.e., is the same as, the location code of one of the detected pixels on screen 303. Each pixel value detector of bank 308 is considered to have the same location code as the detected pixel with which it is registered. Thus, it can be seen that if any detected pixel on screen 303 has the location code M/N, the corresponding detected pixel on screen 312 has the same location code M/N, and the pixel value detectors in both banks 306 and 308 whih are registered with these M/N detected pixels have the same location code, viz., M/N.

As will be evident to those having ordinary skill in the art, informed by the present disclosure, this state of pixel-detector-to-pixel-image registration may be verified, in any particular embodiment of signature verifier 300, by presenting to signature verifier 300 a check which is identical to check 250 except that a good copy of the depositor's signature card signature is imprinted in place of signature 254, whereupon, if this embodiment is well adjusted, the output signal of the correlation coefficient computer on bus 338 will represent 1.0 or a number very close thereto.

As will now be apparent to those having ordinary skill in the art, informed by the present disclosure, the pixel value detector banks, 306, 308, like the other pixel detector banks described herein, consist of more than the pixel detectors themselves. Each detector bank 306, 308 also comprises suitable support means for supporting each individual pixel detector thereof in registration with its associated pixel area of either screen 303 or screen 312. Further, each detector bank comprises suitable ambient light shielding means for preventing stray light from degrading the pixel value signals produced on the output leads of the individual pixel detectors. Since such expedients can be provided by those having ordinary skill in the optical data processing art without the exercise of invention, or undue experimentation, those expedients are not described in detail herein. Additionally, as taught hereinabove, each pixel detector may comprise not only a photodetector and suitable optical coupling means for light-coupling to the corresponding pixel area of the associated screen, 303 or 312, but may also comprise logarithmic amplifying means whereby each photodetector output signal is logarithmically enhanced, the provision of such logarithmic amplifying means being well within the scope of those having ordinary skill in the optical data processing art.

Further, as will be evident to those having ordinary skill in the art when informed by the present disclosure, optical input means 310 may not be a simple biconvex lens, but may also include additional optical elements, such as a beam splitter, by means of which imprint 252 may be illuminated and at the same time an image of imprint 252 may be transmitted, directly or indirectly, to screen 312.

As pointed out hereinabove, the pixel value detectors or pixel detectors of the first pixel detector bank (306) of the signature verifier of said one particularly preferred embodiment of my invention (300) are each so disposed as to detect the gray level value or intensity value of a corresponding one of the highest overall variance pixels of the spectra of the signatures to be classified, and thus the locations of these first bank pixel detectors, taken as a group, will sometimes be called the "overall variance detector constellation".

Thus the signals produced by the pixel value detectors of the first pixel value detector bank 306, taken as a group, might be called the "overall variance detector constellation signal set".

However, since the pixel value detectors of banks 306 and 308 are substantially identically constellated, as explained above, the output signals from the pixel value detectors of first pixel value detector bank 306 will collectively be called the "first detector bank signal set" or FDBSS, and the output signals from the pixel value detectors of second pixel value detector bank 308 will collectively be called the "second detector bank signal set" or SDBSS.

Since indicium spectrum generator 302 is of the type shown in FIGS. 3 through 5 hereof, and described in connection therewith, each pixel value detector bank or constellation 306, 308 comprises a plurality of photosensors corresponding in number to the number of pixels of the detected pixel constellation thereof, optical means for exposing each such photosensor to one and only one of the pixels of the detected pixel constellation as displayed on their respective associated screens 303, 312, and suitable amplifying means associated with each photosensor to stabilize the output thereof against loading error. Such an amplifier may be an integrated circuit operational amplifier, provided with a suitable emitter-follower output stage such as an FET emitter-follower stage, if necessary. Each such amplifier of first pixel value detector bank 306 will be connected to one conductor of the FDBSS bus 318, and thus it will be assumed that so long as signature 254 is operatively presented to indicium spectrum generator 302 a continuous analog signal representative of the gray level value or intensity value of the corresponding overall variance constellation pixel or detected pixel will exist on each conductor of FDBSS bus 318. Each such amplifier of second pixel value detector bank 308 will be connected to one conductor of SDBSS bus 320, and thus it will be assumed that so long as imprint 252 is operatively presented to indicium spectrum generator 308, via optical input means 310, a continuous analog signal representative of the gray level or intensity value of the corresponding overall variance constellation pixel or detected pixel of imprint 252 will exist on each conductor of SDBSS bus 320.

(As in the handwritten numeral reader 160 of my invention, each pixel value detector may comprise a logarithmic amplifier stage, and thus the signals of the FDBSS and the SDBSS may be logarithmically enhanced.)

(It is assumed, of course, that the individual pixel value detectors of banks 306 and 308 are operatively juxtaposed to corresponding pixels of screens 303 and 312, respectively, the location of which pixels has been determined by the overall variance detector constellation determining method of my invention, using an indicium spectrum generator substantially identical to, or at least functionally identical to, indicium spectrum generator 302.)

As pointed out hereinabove, the signals on busses 318 and 320 take the form of analog electrical signals in this embodiment of my invention. For this reason, analog-to-digital converters 322 and 324 are provided to convert the analog signals on busses 318 and 320 into corresponding sets of digital signals, e.g., binary-coded decimal signals, of the kind which the hereinafter described correlation coefficient computer 330 is adapted to receive.

Further, each of the analog-to-digital converter units 322, 324 also includes suitable gating means adapted to be operated by signals from correlation coefficient computer 330 (via the busses 326 and 328 shown in FIG. 12) to control the feeding thereto of the respective sets of digital signals on the conductors of the respective busses 318, 320, seriatim, in the well known manner. Each such gating means is arranged to selectively supply to its associated analog-to-digital converter the successive ones of said sets of digital signals from the corresponding conductors of its associated bus 318 or 320, under the control of correlation coefficient computer 330.

Such analog-to-digital converters and gating means are well known to those having ordinary skill in the art, particularly in the form of integrated circuit "chips". The selection and interconnection of such a combination of integrated circuit "chips" is well within the scope of those having ordinary skill in the art. Alternatively, it is well within the scope of one having ordinary skill in the optical data processing art to make use of two microcomputers, e.g., Intel 8080's, instead of such "chips", to serve the functions of converters 322 and 324.

Bus 332 will sometimes be called herein the first detector bank digital signal set bus or FDBDSS bus because the signals on bus 332 represent, in digital form, the output signals produced by the respective pixel value detectors of first pixel value detector bank 306, i.e., represent the analog signals on FDBSS bus 318 in digital form.

Bus 334 will sometimes be called herein the second detector bank digital signal set bus or SDBDSS bus, because the signals on bus 334 represent, in digital form, the output signals produced by the respective pixel value detectors of second pixel value detector bank 308, i.e., represent the analog signals on SDBSS bus 320 in digital form.

If the number of pixel detectors in each of the pixel detector banks 306, 308 is thirty, then each bus 318, 320 will comprise thirty conductors, each conductor carrying an analog signal provided by a corresponding pixel detector.

It is convenient to assign to the signal carried by each such conductor an identification numeral selected in accordance with the order in which the corresponding detected pixel locations of indicium spectrum generator 303 are swept by the associated writing beam.

Thus, it will be seen that the analog signals on bus 318 consist of thirty separate signals or values, which may be designated as FDBS1, FDBS2, FDBS3, . . . , FDBS29, and FDBS30.

Similarly, it will be seen that the analog signals on the thirty conductors of bus 320 may be designated SDBS1, SDBS2, . . . , SDBS29, and SDBS30.

Thus, it will be seen that each corresponding digital signal on bus 332 for an analog signal on bus 318, may, e.g., comprise five bit signals, and that each corresponding digital signal on bus 334, for an analog signal on bus 320 may, e.g. comprise five bit signals.

It follows that the digital signals which appear on bus 332 may be designated as FDBS1(1), FDSB1(2), FDBS1(4), FDBS1(8), FDBS1(16), FDBS2(1), FDBS2(2), FDBS2(4), FDBS2(8), FDBS2(16), FDBS3(1), FDBS3(2), FDBS3(4), FDBS3(8), FDBS3(16), FDBS4(1), FDBS4(2), FDBS4(4), FDBS4(8), . . . , FDBS30(1), FDBS30(2), FDBS30(4), FDBS30(8), FDBS30(16); and that the digital signals on bus 334 may be designated as SDBS1(1), SDBS1(2), SDBS(4), SDBS(8), . . . SDBS30(16).

While the analog signals FDBS1, . . . FDBS30, and SDBS1, . . . , SDBS30, will be simultaneously present on their respective conductors, the corresponding set of digital signals will be presented seriatim on the corresponding conductors of the respective busses 332, 334, because of the said gating means of converters 322 and 324, controlled respectively by the signals on busses 326 and 328.

Referring again to FIG. 12, it will be seen that the FDBDSS bus 332 and the SDBDSS bus 334 supply input signals to the correlation coefficient computer or correlator 330.

In accordance with the teachings of my invention, correlator 330 serves to correlate the FDBDSS with the SDBDSS in accordance with the one-dimensional correlation formula of FIG. 11.

Referring again to FIG. 12, it will be seen that correlator 330 is provided with an output bus or set of conductors 338, which is also identified herein as the CCSS bus.

By the operation of correlator 330 in accordance with the formula of FIG. 11, bus 338 is supplied with signals, e.g., in binary-coded decimal form, which together represent at any time the numerical value of the one-dimensional correlation coefficient of the FDBDSS and SDBDSS signals then presented to correlator 330 on busses 332 and 334.

Correlator 330 is a dedicated microcomputer which is permanently programmed to compute at any time the numerical value of the one-dimensional correlation coefficient of the then-presented FDBDSS and SDBDSS and to present on the conductors of bus 338 a set of signals representing the numerical value of that correlation coefficient. The set of signals on the conductors of bus 338 are called CCSS herein.

Thus, for example, it will be seen that for each check 250 correlation coefficient computer 330, in accordance with the formula of FIG. 11, computes the product of FDBS1 and SDBS1, the product of FDBS2 and SDBS2, etc., and accumulates these products in a memory location L1 (either internal or external); squares all of the FDBS values, i.e., FDBS1, FDBS2, FDBS3, etc., and cumulates these squared values in a memory location L2; squares all of the SDBS values, i.e., SDBS1, SDBS2, SDBS3, etc., and cumulates these squared values in a memory location L3; computes the product of the summed, squared FDBS values (from L2) and the summed, squared SDBS values (from L3); computes the square root of this product of the summed, squared FDBS and SDBS values; divides the accumulated (FDBS)(SDBS) products in L1 by this square root; and presents the (value of) the quotient on bus 338, e.g., in binary-coded decimal form, this signal set being designated CCSS.

Suitable microcomputers, e.g., the Intel 8080, are well known to those having ordinary skill in the art, and the programming of the same to carry out simple computations such as the computation just described is well within the scope of those having ordinary skill in the art.

Alternatively, the function of correlator 330 may be carried out by a Hewlett-Packard HP45 calculator "chip", wired in the well known manner for control by electrical pulses rather than by calculator pushbuttons (see, for example, *Scientific American*, February, 1979, pages 163 through 166.)

Referring again to FIG. 12, it will be seen that the threshold comparator 340 receives but one input signal set, i.e., CCSS on the conductors of bus 338. Threshold comparator 340 may be a dedicated microcomputer, e.g., Intel 8080, programmed to compare the numerical value of CCSS as received on bus 338 with an internally stored predetermined threshold value, and to produce an H signal on the output line 342 whenever the numerical value of CCSS is less than said predetermined threshold value. Conversely, when the numerical value of CCSS equals or exceeds said predetermined threshold value, an L signal will be produced on output line 342. The programming of a microcomputer to carry out these functions is within the scope of one having ordinary skill in the art. The magnitude of said threshold value may best be determined statistically in accordance with the criticality of the use to which signature verifier 300 is applied.

When, for example, signature verifier 300 is used in conjunction with well known paper check handling apparatus, the signal on line 342 of FIG. 12 may be used to actuate said apparatus to route verified and unverified checks to different receiving pockets or the like.

It will thus be seen that the objects set forth above, among those made apparent from the preceding description, are efficiently attained, and, since certain changes may be made in the above constructions without departing from the scope of my invention, it is intended that all matter contained in the above description, or shown in the accompanying drawings, shall be interpreted as illustrative only, and not in a limiting sense.

Thus, it is to be understood that the term "pattern" as used herein is not limited to indicia, but rather also embraces patterns which do not have an immediate meaning or significance for a substantial class of human viewers, such as fingerprints, voiceprints, and the like, and that those having ordinary skill in the art, taught by the present disclosure, can provide devices for classifying such non-indicial patterns without the exercise of invention and without engaging in undue experimentation.

Further, it is to be understood that my invention is not limited to devices capable of classifying but one handwritten character at a time, but rather also embraces multi-character readers or page readers embodying the principles of my invention as taught herein, and that such multi-character devices may be provided by those having ordinary skill in the art, taught by the present disclosure, without the exercise of invention and without engaging in undue experimentation.

Yet further, it is to be understood that my invention is not limited to devices capable of classifying or reading handwritten characters, or groups of handwritten characters, but rather also embraces devices for classifying or reading mechanically-produced characters of non-standard fonts, or combinations thereof, when such devices embody the principles of my invention as taught herein.

It is also to be understood that while the pattern (indicium) spectrum generator shown and described herein in connection with FIGS. 3, 4, 5A, 5B, and 5C, and used in the various particular embodiments of my invention shown and described hereinabove, comprises a display screen on which are displayed many more pixels than are detected by the associated pixel detectors, my invention also embraces devices and systems the pattern spectrum generators of which generate only the pixels whose values enter into the calculations performed by the associated correlator or correlators.

It is also to be understood that while the transform employed in the pattern (indicium) spectrum generator shown and described herein in connection with FIGS. 3, 4, 5A, 5B, and 5C is the Fourier transform, the employment of other position-invariant transforms, such as the Mellin transform or the Z-transform in lieu of the Fourier transform in carrying out the principles of my invention as taught herein falls within the scope of my invention.

It is also to be understood that while many of the functions carried out automatically in the above-described embodiments of my invention, e.g., the functions of correlation coefficient computer 190, greatest correlation coefficient selector 200, greatest correlation coefficient comparator 202, threshold comparator 204, and rejection gate 206, are said hereinabove to be carried out by separate dedicated microcomputers, two or more of these functions may alternatively be carried out by the same microcomputer, e.g., an Intel 8080, when programmed for carrying out multiple functions, and provided with suitable well known electrical input signal receiving means, all without the exercise of invention and without engaging in undue experimentation.

It is also to be understood that my invention is not limited to the employment of any particular number of pattern spectrum pixels or pixel gray levels.

It is also to be understood that the term "mean" as used herein in describing the MOVM and the MSVM embraces not only the arithmetic mean but also the mode, the median, and other measures of central tendency.

It is to be understood that the term "spectrum" as used herein embraces not only Fourier spectra but also the spectra of other position-invariant transforms, e.g., Mellin transform, Z-transform.

It will now be understood, in view of the abovedescribed embodiments, how voiceprint and fingerprint classifiers, etc., embodying my invention can be provided by those having ordinary skill in the optical data processing art without the exercise of invention.

It is also to be understood that the term "correlation" as used herein should be taken to mean statistical correlation.

It is also to be understood that the following claims are intended to cover all of the generic and specific features of my invention herein described, and all statements of the scope of my invention which, as a matter of language, might be said to fall therebetween.

Thus, it is to be understood that the term "representation" as used herein is not limited to matter displayed in a form suitable for viewing, but rather also embraces data stored in computer memories and the like.

It is also to be understood that while the indicium spectra shown herein and described in connection with the description of the preferred embodiments are of the "checkerboard" or rectilinear type, in which the individual elements or pixels are of square shape, the terms "element" and "pixel" as used herein are not limited to square or rectangular portions of graphical representations.

It is further to be understood that the following terms, which are explicated in the present specification at the pages and figures of the drawings indicated immediately thereafter, are not limited in their denotation by the indicated explications: automatic classification of patterns, 1; C1, C2, etc., 51; CC1, CC2 etc., 52; CC1SS, CC2SS, etc., 56; CCSS, 71; class value set, classification value set, 4; co-original, non-co-original, 17; correlator(s), 5, 45; cosine transformer, 21; cosignificative, non-cosignificative, 18; detected pixel constellation (see also "pixel detector constellation" and "unclassified pixel constellation"), 43; digital image, 7, 8, 9, 10; digital log Fourier signature spectra, 8; element, 76; enhancement, 13; FDBSS, 67; FDBDSS, 69; FDBS1, 70; FDBS1(1), 70; first detector bank signal set, 67; GCC busses, 58; GCCBO bus, 58; handwritten numeral classifying device (reader) 32, FIG. 6; highest origination variance pixel(s) (locations), 40; highest overall variance pixel(s) (locations), 43; highest significant variance pixel(s) (locations), 39; indicium, indica, 10, 11; indicium spectrum, 12; indicium spectrum generator, 12; indicium spectrum matrix, 18; intensity, 8; interpreter, 53; latent information content, 11; logarithmic enhancement, 13; logarithmic function, 14; M1, M2, etc., 46, FIG. 7; mean origination variance matrix (MOVM), 35; mean signification variance matirx (MSVM), 36; non-co-original, 17; NUM/GCC busses, 59; numeral reader, 32, FIG. 6, one-dimensional correlation formula, 5, FIG. 11; origination 4, 17; origination detector constellation, 41; origination index, 42; origination signal correlator, 41; origination value, 49; origination value set, 4, 49; origination variance matrix (OVM), 33; overall index, 45; overall variance detector constellation, 45; overall variance matrix (OVM), 37; patent information content, 11; pattern,11; pixel averager, 24, FIGS. 5A, 5B, 5C; pixel detector constellation, 32, 50; pixel location code, 8; pixel value detector, pixel detector 3; population, 16; R signal, 60; RTC signal, 59; RTL signal, 59: representation, 7; $S_i$, 53; sample, 15; sample of handwritten numerals, 32; SDBSS, 67; SDBDSS, 69; SDBS1, 70; SDBS1(1), 70; second detector bank signal set, 67; signature sample, 15; signature verification device (verifier),41; signification, 4, 17; signification detector constellation, 41; signification index, 42; significant signal correlator, 41; signification value, 46; signification value set, 4; signification value signal set, 48; signification variance matrix, 35; sine transformer, 21; style, 11; SVS"1", SVS"2", etc., 46; SVSS"1", SVSS"2", 52; SV1/"1", SV2/"1", etc., 53; SV22(8)/"5", 47; SVS"x", 47; SVy/"x", 47; SVy(z)/"x", 47; unclassified indicia, 4; unclassified pixel constellation, 3; unclassified pixel value set, 3; unclassified value set, unclassified indicium value set, 4; U, 50; $U_i$, 53; UVS, 47; UVSSU, 50; UVSSU bus, 50.

What is claimed is:

1. Apparatus for the classification of patterns, comprising:

unclassified representation generating means for generating a representation of at least part of a function of a position-invariant transform of each unclassified pattern presented thereto;

transform function representation element value signal set producing means for producing from each of said unclassified representations a set of element value signals each of which represents the value of a property of one of a predetermined constellation of elements thereof; and correlating means for correlating each set of said transform function representation element value signals with at least one set of reference signals;

said elements of said unclassified representations being selected in accordance with a statistical property of a plurality of reference representations each of which represents at least part of said function of said position-invariant transform of a reference pattern, and each one of said plurality of reference patterns being a member of a subset of said plurality of reference patterns all of the members of which are cosignificative and also being a member of a subset of said plurality of reference patterns all of the members of which are co-original.

2. Apparatus for the classification of patterns as claimed in claim 1 in which said statistical property comprises at least one variance matrix of said plurality of reference representations.

3. Apparatus for the classification of patterns as claimed in claim 2 in which said reference patterns are handwritten numerals.

4. Apparatus for the classification of patterns as claimed in claim 2 in which said reference patterns are non-standard font numerals.

5. Apparatus for the classification of patterns as claimed in claim 2 in which at least some of said reference patterns are combinations of handwritten characters.

6. Apparatus for the classification of patterns as claimed in claim 2 in which at least some of said reference patterns are combinations of non-standard font characters.

7. Apparatus for the classification of patterns as claimed in claim 1 in which said statistical property is the signification variance matrix of said plurality of reference representations.

8. Apparatus for the classification of patterns as claimed in claim 1 in which said statistical property is the origination variance matrix of said plurality of reference representations.

9. Apparatus for the classification of patterns as claimed in claim 1 in which said statistical property is the overall variance matrix of said plurality of reference representations.

10. Apparatus for the classification of patterns as claimed in claim 1 in which said reference patterns are handwritten numerals.

11. Apparatus for the classification of patterns as claimed in claim 1 in which said reference patterns are non-standard font numerals.

12. Apparatus for the classification of patterns as claimed in claim 1 in which at least some of said reference patterns are combinations of handwritten characters.

13. Apparatus for the classification of patterns as claimed in claim 1 in which at least some of said reference patterns are combinations of non-standard font characters.

* * * * *